United States Patent
Xiong et al.

(10) Patent No.: US 12,446,115 B2
(45) Date of Patent: *Oct. 14, 2025

(54) HANDLING COLLISION FOR MINI-SLOT-BASED AND SLOT-BASED TRANSMISSION

(71) Applicant: Apple Inc., Cupertino, CA (US)

(72) Inventors: Gang Xiong, Portland, OR (US); Debdeep Chatterjee, San Jose, CA (US); Alexey Khoryaev, Nizhny Novgorod (RU); Sergey Panteleev, Nizhny Novgorod (RU); Hong He, Sunnyvale, CA (US); Yushu Zhang, Beijing (CN); Yongjun Kwak, Portland, OR (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/646,364

(22) Filed: Apr. 25, 2024

(65) Prior Publication Data

US 2024/0276598 A1    Aug. 15, 2024

Related U.S. Application Data

(63) Continuation of application No. 16/500,772, filed as application No. PCT/US2018/031001 on May 3, 2018, now Pat. No. 11,974,364.

(Continued)

(51) Int. Cl.
*H04W 88/06* (2009.01)
*H04L 1/00* (2006.01)
(Continued)

(52) U.S. Cl.
CPC .......... *H04W 88/06* (2013.01); *H04L 1/0013* (2013.01); *H04L 1/0061* (2013.01);
(Continued)

(58) Field of Classification Search
CPC . H04W 88/06; H04W 24/08; H04W 72/0446; H04L 1/0013; H04L 1/0061;
(Continued)

(56) References Cited

U.S. PATENT DOCUMENTS 11,974,364 B2    4/2024  Xiong et al.
2009/0274139 A1*  11/2009  Palanki ................. H04L 1/1854
                                                              370/349

(Continued)

FOREIGN PATENT DOCUMENTS

CN         104756570 A      7/2015

OTHER PUBLICATIONS

Huawei, HiSilicon, "Handling collisions of sTTI/TTI in UL," 3GPP TSG RAN WG1 Meeting #88, Athens, Greece, Feb. 13-17, 2017, R1-1701741; 9 pages.

(Continued)

*Primary Examiner* — Harry H Kim
(74) *Attorney, Agent, or Firm* — Dorsey & Whitney LLP

(57) ABSTRACT

Described is an apparatus of a User Equipment (UE). The apparatus may comprise a first circuitry, a second circuitry, and a third circuitry. The first circuitry may be operable to process one or more configuration transmissions from the gNB carrying a rule for Uplink (UL) collisions and process a first Downlink (DL) transmission and a second DL transmission. The second circuitry may be operable to identify a first UL transmission for the first DL transmission and a second UL transmission for the second DL transmission, the first UL transmission overlapping with the second UL transmission in at least one Orthogonal Frequency Division Multiplexing (OFDM) symbol. The third circuitry may be operable to generate at least one of the first UL transmission and the second UL transmission in accordance with the rule for UL collisions.

20 Claims, 19 Drawing Sheets

Related U.S. Application Data

(60) Provisional application No. 62/501,887, filed on May 5, 2017, provisional application No. 62/500,779, filed on May 3, 2017.

(51) Int. Cl.

| | | |
|---|---|---|
| *H04L 1/1607* | (2023.01) | |
| *H04L 1/1812* | (2023.01) | |
| *H04L 1/1829* | (2023.01) | |
| *H04L 1/1867* | (2023.01) | |
| *H04L 5/00* | (2006.01) | |
| *H04W 24/08* | (2009.01) | |
| *H04W 72/0446* | (2023.01) | |

(52) U.S. Cl.
CPC .......... *H04L 1/1664* (2013.01); *H04L 1/1819* (2013.01); *H04L 1/1887* (2013.01); *H04L 5/0007* (2013.01); *H04L 5/0055* (2013.01); *H04W 24/08* (2013.01); *H04W 72/0446* (2013.01)

(58) Field of Classification Search
CPC ... H04L 1/1664; H04L 1/1819; H04L 1/1887; H04L 5/0007; H04L 5/0055; H04L 1/1893; H04L 1/1896; H04L 1/1854; H04L 1/1845
See application file for complete search history.

(56) References Cited

U.S. PATENT DOCUMENTS

| | | | |
|---|---|---|---|
| 2015/0098422 | A1 | 4/2015 | Sartori et al. |
| 2015/0139141 | A1* | 5/2015 | Seo ....................... H04L 5/0048 370/329 |
| 2015/0257150 | A1* | 9/2015 | Yi ............................ H04B 7/26 370/329 |
| 2015/0305003 | A1 | 10/2015 | Chen et al. |
| 2016/0261337 | A1* | 9/2016 | Mukai .................... H04B 10/03 |
| 2016/0309510 | A1 | 10/2016 | Wong et al. |
| 2016/0338110 | A1 | 11/2016 | Wang et al. |
| 2018/0191470 | A1* | 7/2018 | Manolakos ........... H04L 1/1864 |
| 2018/0278454 | A1* | 9/2018 | Islam .................... H04L 1/0038 |
| 2019/0052412 | A1* | 2/2019 | Lopez ................... H04L 1/1848 |
| 2019/0261337 | A1 | 8/2019 | Park |
| 2020/0008216 | A1* | 1/2020 | Iyer ....................... H04W 72/23 |
| 2020/0077470 | A1 | 3/2020 | Xiong et al. |
| 2020/0288491 | A1* | 9/2020 | Liu .................... H04W 72/0446 |
| 2020/0367278 | A1* | 11/2020 | Hosseini ............... H04W 76/27 |

OTHER PUBLICATIONS

Qualcomm Incorporated, "Collision handling," 3GPP TSG RAN WG1 Meeting #86bis, Lisbon, Portugal Oct. 10-14, 2016, R1-1609985; 7 pages.
International Search Report and Written Opinion for PCT Application No. PCT/US18/31001, mailed Sep. 10, 2018.
Huawei, et al., "Handling collision between sTTI and 1ms TTI", 3GPP Draft; R1-1608640, 3rd Generation Partnership Project; vol. RAN WG1, No. Lisbon, Portugal, Oct. 9, 2016.
Nokia et al., "On indication for downlink punctured/ preemptive scheduling," 3GPP TSG-RAN WG1#88, R1-1703327, Agenda Item: 8.1.3.4.1, Feb. 13-17, 2017, Athens, Greece, 4 pages.
Extended European Search Report directed to European Patent Application No. 22213723.4, European Patent Office, mailed Feb. 6, 2023; 10 pages.
Hua Wei et al., "UCI on sPUSCH", 3GPP Draft; R1-1608639, 3rd Generation Partnership Project (3GPP), Mobile Competence Centre; RAN WG 1, Lisbon, Portugal; Oct. 9, 2016, 8 pages.

\* cited by examiner

400

900

HANDLING COLLISION FOR MINI-SLOT-BASED AND SLOT-BASED TRANSMISSION

CLAIM OF PRIORITY

The present application is a continuation of U.S. application Ser. No. 16/500,772, filed Oct. 3, 2019, which is a National Stage Entry of and claims priority to International Patent Application Serial No. PCT/US2018/031001, filed on May 3, 2018 and entitled "Handling Collision for Mini-Slot-Based and Slot-Based Transmission," which claims priority under 35 U.S.C. § 119(e) to U.S. Provisional Patent Application Ser. No. 62/500,779 filed May 3, 2017 and entitled "Mechanisms on Handling Collision for Mini-Slot and Slot Based Transmissions for NR," and to U.S. Provisional Patent Application Ser. No. 62/501,887 filed May 5, 2017 and entitled "Enhanced Pre-emption Indication Signaling for Multiplexing of New Radio Transmissions of Different Durations," all of which are herein incorporated by reference in their entirety.

BACKGROUND

A variety of wireless cellular communication systems have been implemented, including a 3rd Generation Partnership Project (3GPP) Universal Mobile Telecommunications Systems (UMTS) system, a 3GPP Long-Term Evolution (LTE) system, and a 3GPP LTE-Advanced (LTE-A) system. Next-generation wireless cellular communication systems based upon LTE and LTE-A systems are being developed, such as a Fifth Generation (5G) wireless system/5G mobile networks system.

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION

Figure 1:
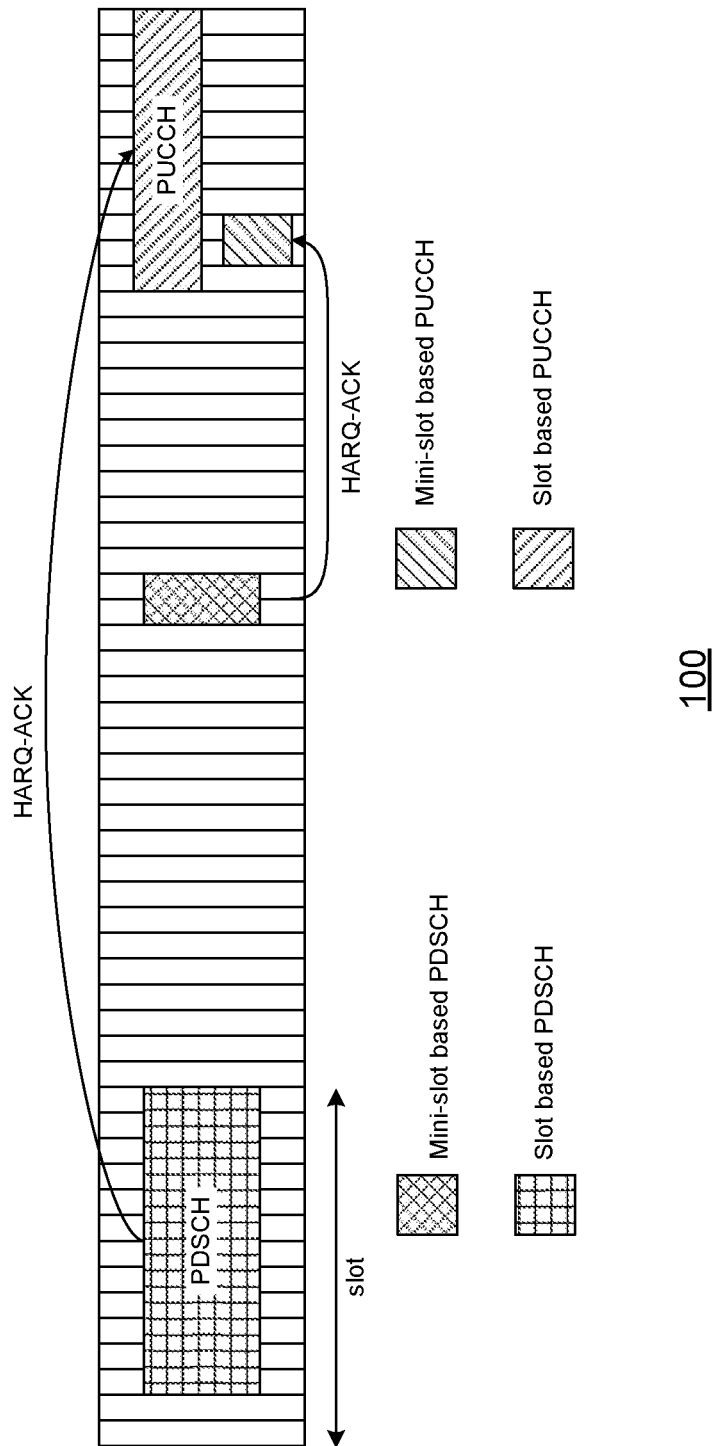
FIG. 1 illustrates a scenario of potential Physical Uplink Control Channel (PUCCH) collision for mini-slot-based and slot-based feedback, in accordance with some embodiments of the disclosure.

Various wireless cellular communication systems have been implemented or are being proposed, including 3rd Generation Partnership Project (3GPP) Universal Mobile Telecommunications Systems (UMTS), 3GPP Long-Term Evolution (LTE) systems, 3GPP LTE-Advanced (LTE-A) systems, and 5th Generation (5G) wireless systems/5G mobile networks systems/5G New Radio (NR) systems.

Mobile communication has evolved significantly from early voice systems to today's integrated communication platforms. Next generation wireless communication system (e.g. 5G and/or NR) may provide access to information and sharing of data anywhere, anytime by various users and applications. NR may be a unified network and/or system that targets to meet vastly different and sometimes conflicting performance dimensions and services. Such diverse multi-dimensional requirements may be driven by different services and applications. In general, NR may evolve based on 3GPP LTE-A with additional potential new Radio Access Technologies (RATs) to provide better, simpler, and seamless wireless connectivity solutions. NR may enable a wide variety of things connected by wireless communication systems, and may deliver fast, rich content and services.

The enhanced Mobile Broadband (eMBB) and ultra-reliable and low latency communications (URLCC) NR use case families may have very different requirements in terms of user plane latency and required coverage levels. Some requirements for URLLC may relate to user-plane latency and/or reliability. For URLLC, a target for user plane latency may be 0.5 milliseconds (ms) for Uplink (UL), and may be 0.5 ms for Downlink (DL). A target for reliability may be 1-10.sup.−5 within 1 ms.

Toward this end, mini-slot structures may be defined for NR, to support very low latency including URLLC for certain slot lengths. They may also be used to support finer Time Division Multiplexing (TDM) granularity of scheduling for the same UEs and/or different UEs within a slot in cases in which beam sweeping is employed. Note that mini-slots may start at any OFDM symbol, at least for carrier frequencies above 6 gigahertz (GHz). Further, mini-slots with lengths of 1 symbol may be supported for at least above 6 GHz, while at least 2 symbol durations for mini-slots may be supported for URLLC application.

For NR, UL control channels with short duration and long duration may be supported. More specifically, a short Physical Uplink Control Channel (PUCCH) may span 1 or 2 symbols, while a long PUCCH may span any number of symbols (e.g., from 4 to 14 symbols). The short PUCCH may be transmitted around last transmitted UL symbol(s) of a slot and long PUCCH may be transmitted in a merely-UL slot or a UL centric slot with a variable number of symbols, with a minimum of 4 symbols for PUCCH transmission.

For a given UE, both mini-slot and slot based transmission may be supported. In cases in which an NR Evolved Node-B (gNB) schedules both mini-slot and slot based DL transmission, PUCCH carrying Hybrid Automatic Repeat Request (HARQ) Acknowledgement (ACK) feedback for these two DL data transmissions may collide.

FIG. 1 illustrates a scenario 100 of potential Physical Uplink Control Channel (PUCCH) collision for mini-slot-based and slot-based feedback, in accordance with some embodiments of the disclosure. FIG. 1 illustrates one example of potential PUCCH collision for mini-slot and slot based HARQ-ACK feedback. In this case, certain mechanisms may be disposed to being defined to handle such a collision and/or to ensure alignment between a gNB and a UE for proper decoding.

Discussed herein are mechanisms and methods for handling PUCCH collision for mini-slot and slot based transmission for NR. Some embodiments may be applied for handling PUSCH collision for mini-slot and slot based transmission. Some embodiments may be applied for handling collision between long PUCCH and PUSCH with mini-slot based transmission. Some embodiments may be applied for handling collision between PUSCH with slot based transmission and short PUCCH.

As discussed herein, the phrase "mini-slot-based transmission" may refer to symbol level based transmission, wherein a DL data channel (e.g., a Physical Downlink Shared Channel (PDSCH)) resource allocation in the time-domain has a granularity of one or more OFDM symbols. This may be contrasted with "slot-based transmission" in which a DL data channel resource allocation in the time-domain may have a granularity of slots that may span, e.g., 7 or 14 symbols. However, note that even for cases of "slot-based transmissions," an entire slot (i.e., 7 or 14 symbols) might not be assigned for PDSCH in corresponding frequency domain resources (e.g., Physical Resource Blocks (PRBs)).

Moreover, a design goals for 3GPP NR air-interfaces may be to efficiently support multiple different services (e.g., eMBB, URLLC, and/or massive Machine Type Communications (mMTC)) in one spectrum. eMBB, URLLC, and mMTC services may require different set of L1 parameters optimized for the specific services. As a result, different numerologies (e.g., subcarrier spacing, symbol duration, and so forth), along with bandwidth and other system parameters like transmission modes and feedback procedures, may be used for various data rates, latency requirements, and so on.

A major challenge for NR design may be to enable efficient multiplexing of eMBB and URLLC services in the same spectrum. A reason is that both services may require large bandwidth (e.g., tens of megahertz (MHz)), but may have different latency requirements that limit applicability of simple frequency domain multiplexing and may lead to being disposed to TDM approaches. One design option may be to enable semi-static partitioning of resources in the time-domain by allocating certain resources for URLLC and eMBB; however, such designs may suffer from low efficiency and/or peak data rate losses of both eMBB and URLLC services. Therefore, dynamic multiplexing approaches may be more advantageous for efficient operation of both URLLC and eMBB services in one spectrum.

In various embodiments, for DL, dynamic resource sharing between URLLC and eMBB may be supported by transmitting URLLC scheduled traffic, and URLLC transmission may occur in resources scheduled for ongoing eMBB traffic. Assuming that typical URLLC transmission duration may be shorter than an eMBB transmission, URLLC transmission may preempt an ongoing eMBB transmission (e.g., may puncture the resource elements already scheduled for eMBB). In particular, a gNB may interrupt an eMBB transmission on a subset of allocated resources in favor of URLLC transmission.

Figure 2:
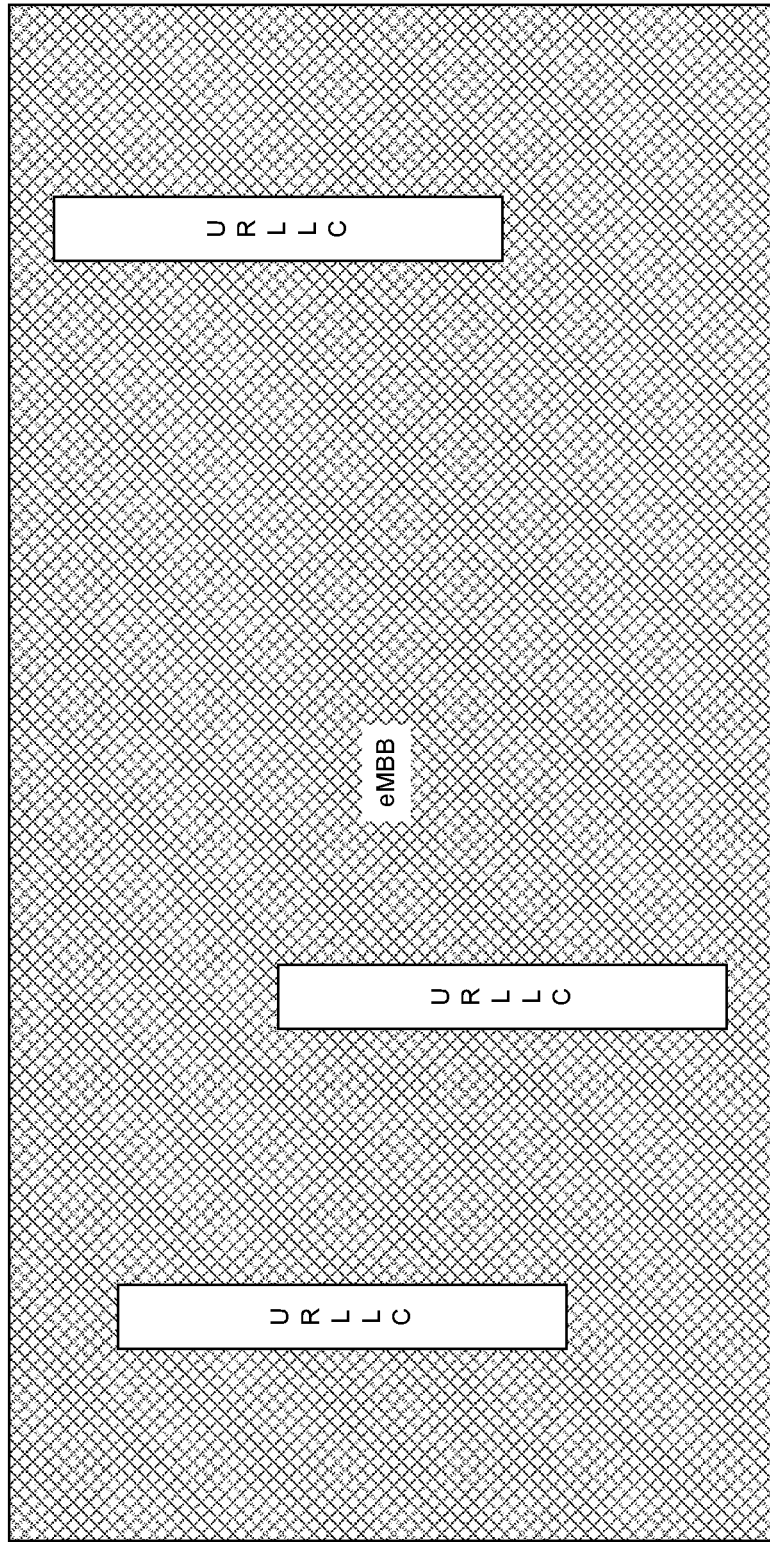
FIG. 2 illustrates a scenario of enhanced Mobile Broadband (eMBB) and/or Ultra-Reliable Low-Latency Communications (URLLC) preemption, in accordance with some embodiments of the disclosure.

Such an approach may work without additional mechanisms to inform an eMBB UE about a preemption (e.g., puncturing) event, depending on transmission code rate and channel coding scheme, which may sustain the puncturing of a small number of resource elements. FIG. 2 illustrates a scenario 200 of enhanced Mobile Broadband (eMBB) and/or Ultra-Reliable Low-Latency Communications (URLLC) preemption, in accordance with some embodiments of the disclosure.

Discussed herein are mechanisms and methods for signaling of pre-emption and/or puncturing events and their usage in UE and gNB procedures. In various embodiments, solutions may improve NR eMBB performance in cases when eMBB transmission is interrupted by URLCC transmission, and an interruption/pre-emption/puncturing indication is signaled to impacted UEs. Some embodiments pertain to standalone pre-emption indication signaling carried in common search space or UE-specific search space PDCCH may relate to physical resources that minimize system overhead for such indications. Some embodiments pertain to indication monitoring triggering conditions. Some embodiments pertain to mechanisms of updating HARQ feedback timing in cases of pre-emption. Some embodiments may relate to optimized signaling of pre-emption in cases of enabled code block group retransmissions.

Pre-emption events may not be indicated to affected UEs that may cause significant degradation even if retransmission is scheduled. This may happen due to irrelevant receiver soft metrics in a pre-empted region, which might not be further used for proper combining. These events may be detected by UEs; however, that may cause significant processing burden without guaranteeing proper detection of pre-empted resource elements. Efficient indication methods may improve informing UEs about corrupted resources and adjusting receive processing accordingly. Various efficient indication methods are discussed herein.

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For purposes of the embodiments, the transistors in various circuits, modules, and logic blocks are Tunneling FETs (TFETs). Some transistors of various embodiments may comprise metal oxide semiconductor (MOS) transistors, which include drain, source, gate, and bulk terminals. The transistors may also include Tri-Gate and FinFET transistors, Gate All Around Cylindrical Transistors, Square Wire, or Rectangular Ribbon Transistors or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bipolar junction transistors-BJT PNP/NPN, BiCMOS, CMOS, etc., may be used for some transistors without departing from the scope of the disclosure.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

In addition, for purposes of the present disclosure, the term "eNB" may refer to a legacy LTE capable Evolved Node-B (eNB), a Narrowband Internet-of-Things (NB-IoT) capable eNB, a Cellular Internet-of-Things (CIoT) capable eNB, a Machine-Type Communication (MTC) capable eNB, an eMBB capable eNB, a URLLC capable eNB, an mMTC capable eNB, and/or another base station for a wireless communication system. The term "gNB" may refer to a 5G-capable or NR-capable eNB. For purposes of the present disclosure, the term "UE" may refer to a legacy LTE capable User Equipment (UE), an NB-IoT capable UE, a CIoT capable UE, an MTC capable UE, an eMBB capable eNB, a URLLC capable eNB, an mMTC capable eNB, and/or another mobile equipment for a wireless communication system. The term "UE" may also refer to a next-generation or 5G capable UE.

Various embodiments of eNBs and/or UEs discussed below may process one or more transmissions of various types. Some processing of a transmission may comprise demodulating, decoding, detecting, parsing, and/or otherwise handling a transmission that has been received. In some embodiments, an eNB or UE processing a transmission may determine or recognize the transmission's type and/or a condition associated with the transmission. For some embodiments, an eNB or UE processing a transmission may act in accordance with the transmission's type, and/or may act conditionally based upon the transmission's type. An eNB or UE processing a transmission may also recognize one or more values or fields of data carried by the transmission. Processing a transmission may comprise moving the transmission through one or more layers of a protocol stack (which may be implemented in, e.g., hardware and/or software-configured elements), such as by moving a transmission that has been received by an eNB or a UE through one or more layers of a protocol stack.

Various embodiments of eNBs and/or UEs discussed below may also generate one or more transmissions of various types. Some generating of a transmission may comprise modulating, encoding, formatting, assembling, and/or otherwise handling a transmission that is to be transmitted. In some embodiments, an eNB or UE generating a transmission may establish the transmission's type and/or a condition associated with the transmission. For some embodiments, an eNB or UE generating a transmission may act in accordance with the transmission's type, and/or may act conditionally based upon the transmission's type. An eNB or UE generating a transmission may also determine one or more values or fields of data carried by the transmission. Generating a transmission may comprise moving the transmission through one or more layers of a protocol stack (which may be implemented in, e.g., hardware and/or software-configured elements), such as by moving a transmission to be sent by an eNB or a UE through one or more layers of a protocol stack.

In various embodiments, resources may span various Resource Blocks (RBs), Physical Resource Blocks (PRBs), and/or time periods (e.g., frames, subframes, and/or slots) of a wireless communication system. In some contexts, allocated resources (e.g., channels, Orthogonal Frequency-Division Multiplexing (OFDM) symbols, subcarrier frequencies, resource elements (REs), and/or portions thereof) may be formatted for (and prior to) transmission over a wireless communication link. In other contexts, allocated resources (e.g., channels, OFDM symbols, subcarrier frequencies, REs, and/or portions thereof) may be detected from (and subsequent to) reception over a wireless communication link.

Aspects of various embodiments discussed herein may pertain to handling PUCCH collision for mini-slot and slot based transmission for NR. As discussed herein, in cases when both mini-slot and slot based DL transmission are scheduled, due to mini-slot based transmission potentially carrying data for URLLC application, which may be predisposed to using fast HARQ-ACK to meet stringent latency requirement, PUCCH carrying HARQ-ACK feedback for both mini-slot and slot based DL transmissions may collide as shown in FIG. 1. In this case, certain mechanisms may be disposed to being defined to handle such a collision to ensure alignment between a gNB and a UE for proper decoding. Note that a collision may occur in a case when two or more PUCCHs overlap at least one symbol in the time domain.

Note that embodiments mentioned in the following sections may be straightforwardly extended to cases when PUCCH for slot based transmission carries other Uplink Control Information (UCI) information (e.g., beam state report or channel state information (CSI) report) and collides with PUCCH carrying HARQ-ACK feedback for mini-slot based DL transmission.

Further, similar design principles may be extended to cases when PUSCH for slot based transmission collides with PUCCH carrying HARQ-ACK feedback for mini-slot based DL transmission, or cases when PUSCH with slot based transmission collides with PUSCH with mini-slot based transmission for a given UE.

Embodiments of handling PUCCH collision for mini-slot and slot based DL transmission are provided herein. Note that although the following sections show short PUCCH being used to carry HARQ-ACK feedback for mini-slot based DL transmission and long PUCCH being used to carry HARQ-ACK feedback for slot based DL transmission, various embodiments may be similarly applicable to the cases wherein different PUCCH durations or the same PUCCH duration are used to carry HARQ-ACK feedback for mini-slot-based or slot-based DL transmissions.

In some embodiments, in cases of HARQ-ACK collision between PUCCH in a mini-slot and PUCCH in a slot, a UE may drop the PUCCH which carries HARQ-ACK feedback for slot based DL transmission. In order to meet stringent latency requirements for URLLC transmission, HARQ-ACK feedback for mini-slot based PDSCH transmission may be disposed to being transmitted as a higher priority.

As a further extension to give higher priority to mini-slot (e.g., URLLC traffic) transmission, in cases in which different numerologies are applied for transmissions of different PUCCH carrying HARQ-ACK for slot and mini-slot based transmission, if a UE does not support frequency division multiplexing (FDM) based multiplexing of different numerologies for UL transmissions, the UE may drop the PUCCH carrying HARQ-ACK feedback for slot based DL transmission.

In some embodiments, a dropping rule or a priority rule in case of collisions (e.g., a rule for UL collisions) may be defined in accordance with a timing of DL assignment. For instance, DL assignment which is received at a later time may be considered to have higher priority.

In some embodiments, the dropping rule or the priority rule in case of collisions can be defined in accordance with the duration of a colliding PUCCH transmission, and/or whether short or long PUCCH is employed. For instance, a long PUCCH may be considered to have a higher priority than a short PUCCH.

In some embodiments, the dropping rule or the priority rule in case of collisions may be defined in accordance with UCI content carried by colliding PUCCHs. For instance, HARQ-ACK feedback may have a higher priority than other UCI types, such as channel state information (CSI) report.

In some embodiments, in cases of PUCCH collision between mini-slot and slot based transmission, a UE may delay a PUCCH which carries HARQ-ACK feedback for slot based DL transmission. Further, a duration of PUCCH carrying HARQ-ACK for slot based DL transmission may be reduced accordingly. Additionally, PUCCH carrying HARQ-ACK for mini-slot based DL transmission may be transmitted prior to that for slot based DL transmission.

In some embodiments, to advantageously promote alignment between a gNB and a UE and/or to allow a gNB to properly decode PUCCH, certain rules may be defined. In particular, a UE may delay PUCCH carrying HARQ-ACK feedback for slot based DL transmission when an end symbol for the transmission of PUCCH carrying HARQ-ACK feedback for mini-slot based DL transmission is less than or equal to a threshold, wherein the threshold can be predefined (e.g., by specification) in accordance with a slot duration, or may be configured by higher layers via a master information block (MIB) transmission, a remaining master information block (RMIB) transmission, a system information block (SIB) transmission, or radio resource control (RRC) signaling transmission.

Figure 3:
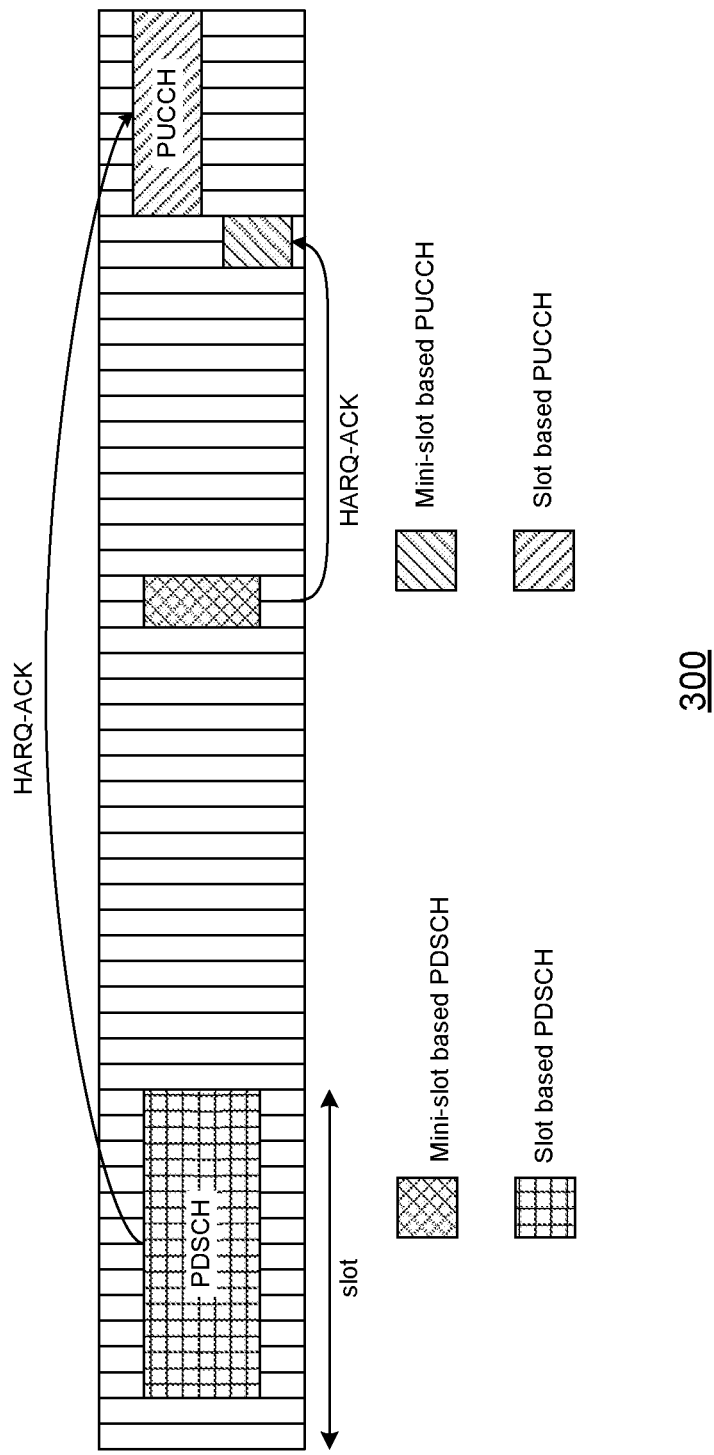
FIG. 3 illustrates a scenario of delayed PUCCH carrying Hybrid Automatic Repeat Request (HARQ) Acknowledgement (ACK) for slot-based Downlink (DL) transmission, in accordance with some embodiments of the disclosure.

FIG. 3 illustrates a scenario 300 of delayed PUCCH carrying Hybrid Automatic Repeat Request (HARQ) Acknowledgement (ACK) for slot-based Downlink (DL) transmission, in accordance with some embodiments of the disclosure. FIG. 2 illustrates one example of delayed PUCCH carrying HARQ-ACK for slot based DL transmission. In the example, it a threshold may be symbol #5 for a slot duration of 14 symbols. In this case, PUCCH carrying HARQ-ACK for slot based DL transmission may span 8 symbols until the end of a slot and may be transmitted after PUCCH carrying HARQ-ACK for mini-slot based DL transmission.

In some embodiments, in cases of PUCCH collision between mini-slot and slot based transmission, a UE may puncture or rate match a PUCCH which carries HARQ-ACK feedback for slot based DL transmission. The punctured symbols may be used to transmit the PUCCH carrying HARQ-ACK feedback for mini-slot based DL transmission. Depending on the time domain positions of PUCCH for mini-slot and slot based transmission, PUCCH carrying HARQ-ACK feedback for slot based DL transmission may be transmitted before and after the PUCCH carrying HARQ-ACK feedback for mini-slot based DL transmission.

If the time domain orthogonal cover code (OCC) is applied for PUCCH carrying HARQ-ACK feedback for slot based DL transmission, a shortened OCC may be used.

Alternatively, OCC may be disabled for PUCCH carrying HARQ-ACK feedback for mini-slot based DL transmission.

Figure 4:
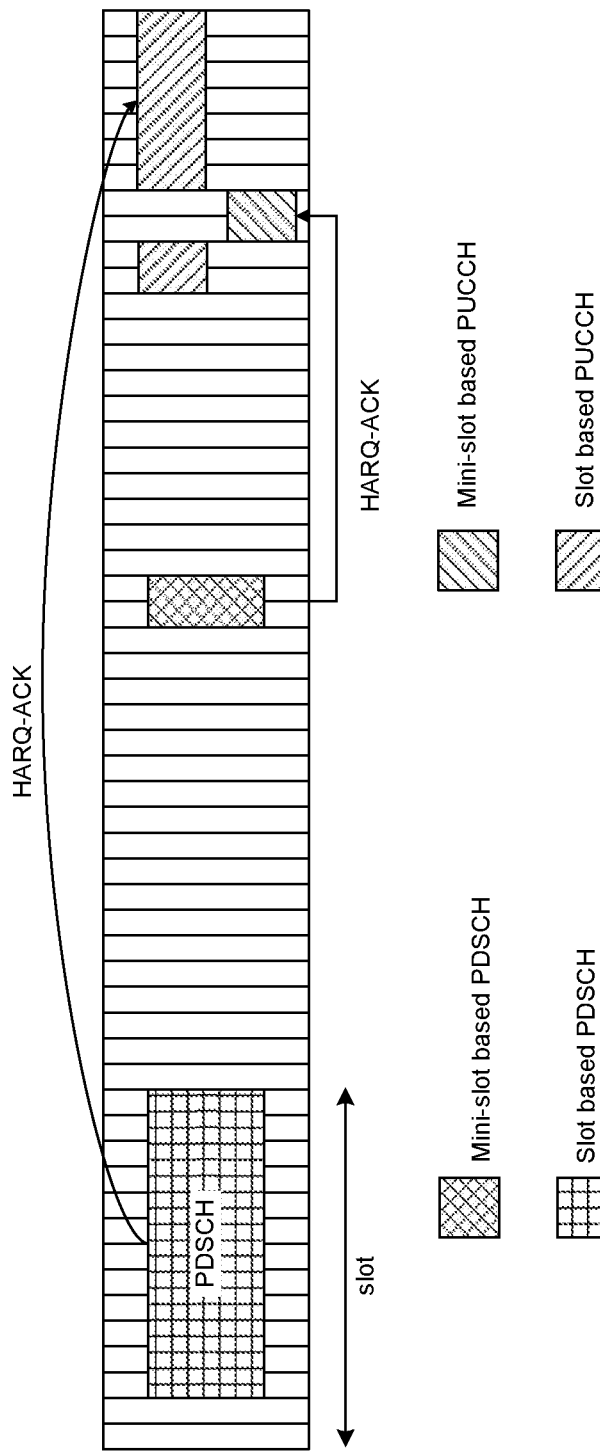
FIG. 4 illustrates a scenario of puncturing PUCCH carrying HARQ-ACK for slot-based DL transmission, in accordance with some embodiments of the disclosure.

FIG. 4 illustrates a scenario 400 of puncturing PUCCH carrying HARQ-ACK for slot-based DL transmission, in accordance with some embodiments of the disclosure. FIG. 4 illustrates one example of puncturing PUCCH carrying HARQ-ACK for slot based DL transmission. In this example, symbol #5 and/or symbol #6 for PUCCH carrying HARQ-ACK for slot based DL transmission may be punctured and used for transmission of PUCCH carrying HARQ-ACK merely for mini-slot based DL transmission.

In some embodiments, in cases of PUCCH collision between mini-slot and slot based transmission, a joint uplink control information (UCI) may be transmitted in one of the PUCCHs for slot or mini-slot based transmission. Note that separate resource mapping may be employed to allow REs carrying HARQ-ACK feedback for mini-slot based DL transmission to be transmitted at the beginning of PUCCH. This approach may help meet stringent latency requirement for URLLC application.

In some embodiments, alternatively, joint UCI may be transmitted merely when two PUCCHs overlap completely in time, or the transmission of these two PUCCHs may be the same. Otherwise, one of the PUCCHs may be dropped in accordance with the dropping rule or the priority rule as mentioned above.

For some embodiments, in cases of collision, HARQ-ACK feedback for mini-slot based transmission, when carried using short PUCCH formats, may be piggybacked on the PUCCH carrying HARQ-ACK feedback for slot based transmission, when carried using long PUCCH formats. A similar principle for UCI piggybacking on PUSCH may be defined for such cases.

In some embodiments, when stringent latency requirement for mini-slot based transmission are not governing, a joint UCI may be considered. More specifically, for HARQ-ACK feedback, either semi-static or dynamic HARQ-ACK codebook may be used to determine an order of HARQ-ACK bits and HARQ-ACK payload size.

Figure 5:
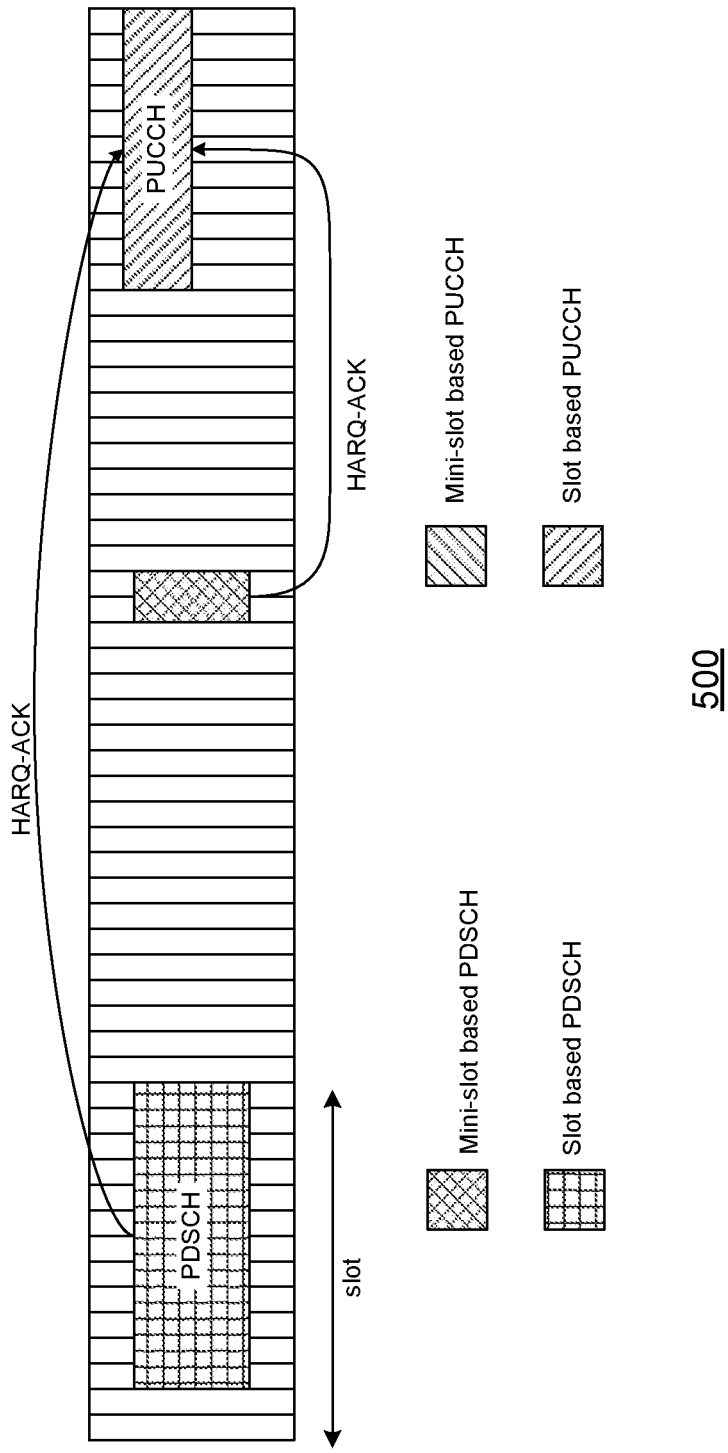
FIG. 5 illustrates a scenario of joint HARQ-ACK feedback for slot-based and mini-slot-based DL transmission, in accordance with some embodiments of the disclosure.

FIG. 5 illustrates a scenario 500 of joint HARQ-ACK feedback for slot-based and mini-slot-based DL transmission, in accordance with some embodiments of the disclosure. FIG. 5 illustrates one example of joint HARQ-ACK feedback for slot and mini-slot based DL transmission. In this example, HARQ-ACK for mini-slot and slot based DL transmission may be jointly carried by PUCCH for slot based transmission.

In some embodiments, in cases of PUCCH collision between mini-slot and slot based transmission, two PUCCHs may be transmitted in contiguous resources, which may advantageously help reduce inter-modulation distortion (IMD). Whether to enable the transmission of two PUCCHs in contiguous resources may be configured by higher layers via MIB, RMIB, SIB or RRC signaling. Note that in cases of PUCCH collisions, a UE may transmit PUCCH carrying HARQ-ACK feedback for slot based transmission in accordance with originally configured resources, and the UE may transmit PUCCH carrying HARQ-ACK feedback for mini-slot based transmission on an edge of configured resources for PUCCH carrying HARQ-ACK feedback for slot based transmission.

In some embodiments, a UE may be configured with two contiguous resources for PUCCH transmissions. In cases of collisions, the UE may transmit these two PUCCHs in accordance with the configured contiguous resources.

For some embodiments, a UE may transmit both PUCCHs in cases when the configured resources for colliding PUCCH are contiguous. In cases in which configured resources are not contiguous, a UE may drop one of PUCCHs in accordance with the dropping rule or the priority rule as mentioned above. Note that the mechanism may be configurable to consider OFDM based UL transmissions and non-power-limited UE.

Figure 6:
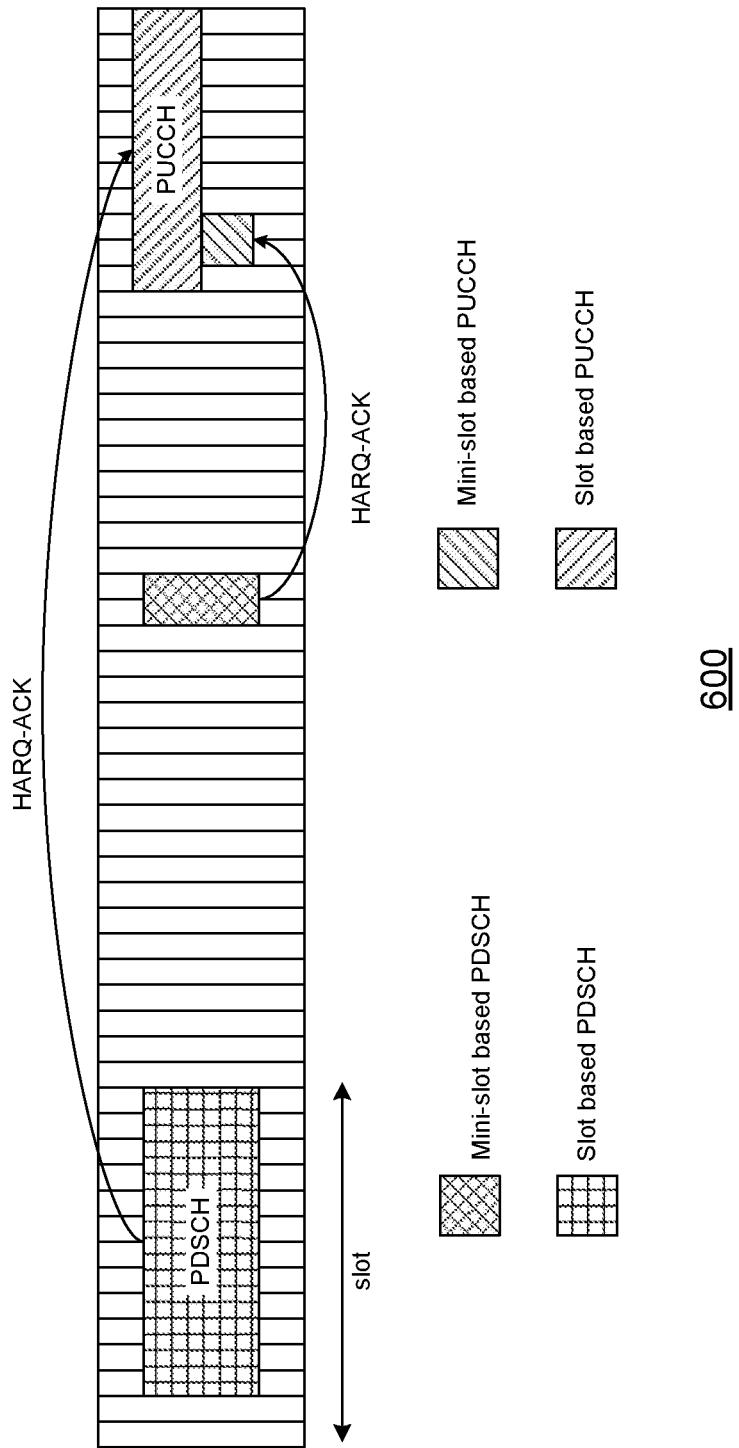
FIG. 6 illustrates a scenario of transmission of two PUCCHs in contiguous resources, in accordance with some embodiments of the disclosure.

FIG. 6 illustrates a scenario 600 of transmission of two PUCCHs in contiguous resources, in accordance with some embodiments of the disclosure.

In various embodiments, various aspects are described related to collision handling between UCI transmissions in a mini-slot and a slot. In general, dropping either UCI transmission (e.g., when both contain HARQ-ACK feedback) may negatively affect the DL performance of an associated DL channel. In some designs, a HARQ-ACK bundling or compression scheme may be implemented to reduce the HARQ-ACK payload, and the bundled or compressed HARQ-ACK bits may be transmitted using a PUCCH transmitted in the mini-slot to reduce the latency. If PUCCH transmitted in the slot does not include HARQ-ACK information (e.g., CQI), the UE may be disposed to drop the UCI on PUCCH in the slot, and to transmit it on PUCCH in the mini-slot, as that may be generally more advantageous for mini-slot operations.

Various embodiments may pertain to methods that facilitate simultaneous transmission of control information for both mini-slot and slot operations. In some designs, UCI information for slot and mini-slot may be jointly encoded and mapped to one or more predefined resource regions of PUSCH transmitted in the slot.

Figure 7:
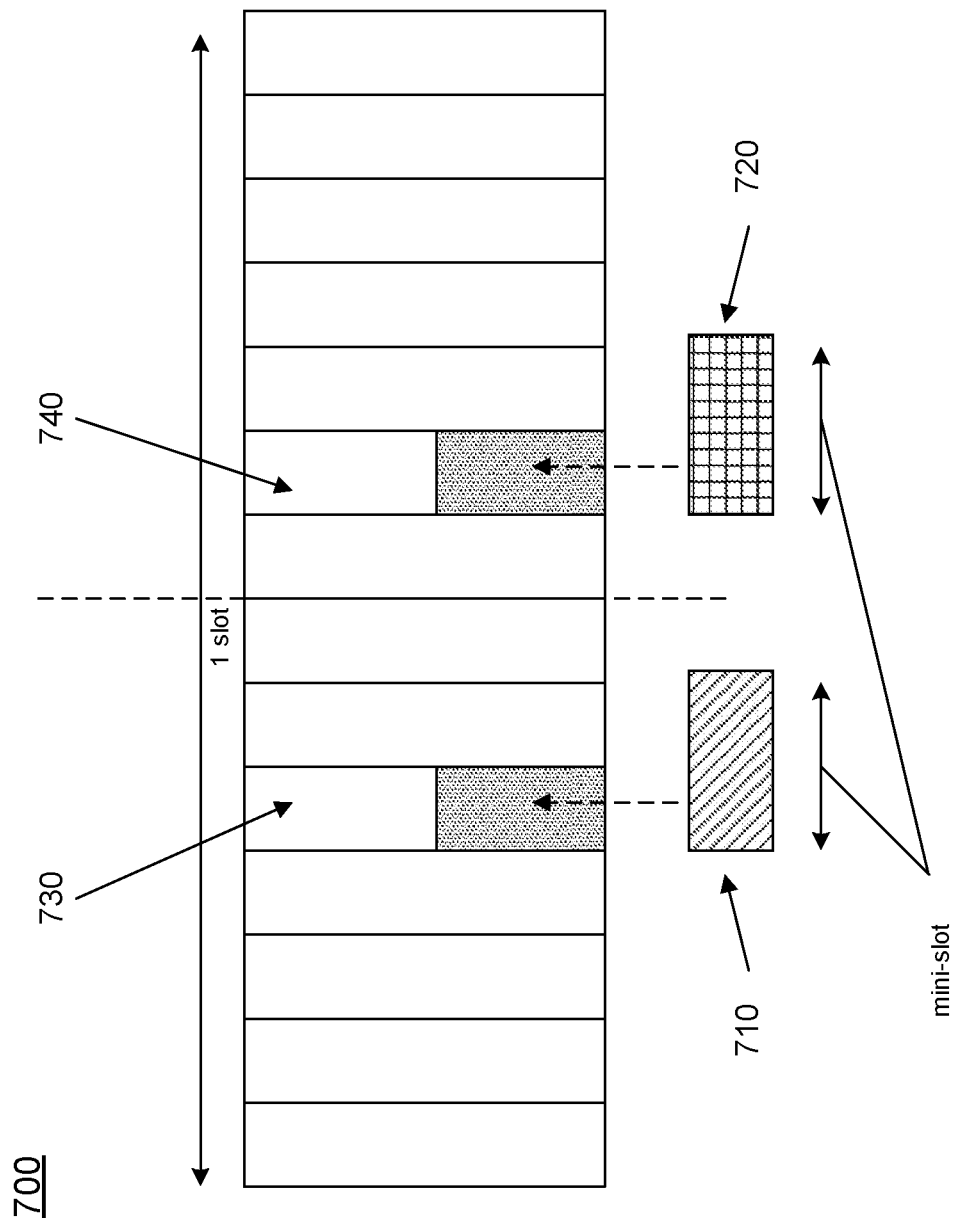
FIG. 7 illustrates a scenario of Uplink Control Information (UCI) for mini-slot piggybacking on slot transmission, in accordance with some embodiments of the disclosure.

FIG. 7 illustrates a scenario 700 of Uplink Control Information (UCI) for mini-slot piggybacking on slot transmission, in accordance with some embodiments of the disclosure. In FIG. 7, a UCI 710 and a UCE 720 associated with mini-slot operation may be transmitted on PUSCH channels of a slot 730 and a slot 740, when these channels with different length in the time domain are scheduled in a same slot. As an example, these UCI may be carried starting at a first symbol of overlapping regions (e.g., between these mini-slots and slots), and may be mapped in an order first of increasing frequency and then time, starting from the lowest frequency of PUSCH channel.

Figure 8:
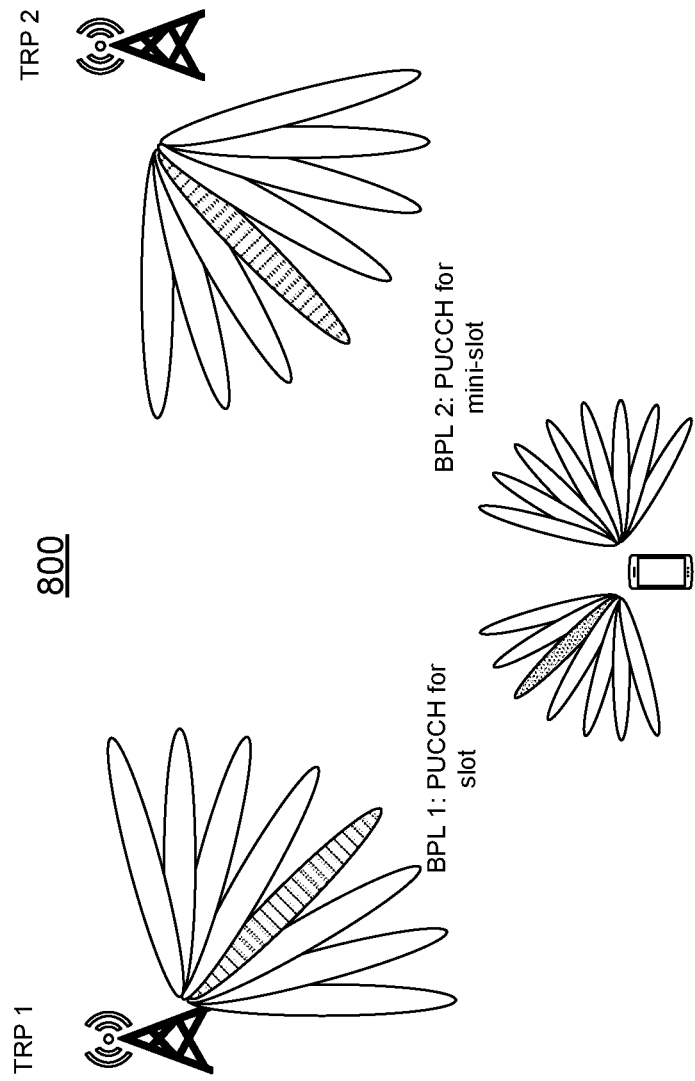
FIG. 8 illustrates a scenario of PUCCH transmission in multiple Beam Pair Links (BPLs), in accordance with some embodiments of the disclosure.

FIG. 8 illustrates a scenario 800 of PUCCH transmission in multiple Beam Pair Links (BPLs), in accordance with some embodiments of the disclosure. In some embodiments, if there are multiple beam pair links (BPLs) for PUCCH transmission, where some BPLs can be used simultaneously (e.g., one BPL may be used between one Transmission/Reception Point (TRP) to one UE antenna panel), a UE may report PUCCH for mini-slot and slot simultaneously. A gNB may then configure fallback BPLs for PUCCH for mini-slot and slot based transmission when the collision happens by higher-layer signaling or Downlink Control Information (DCI). Alternatively, in some embodiments, the fallback behavior may be pre-defined (e.g., the PUCCH for slot based transmission may fall back to a second BPL if a collision happens).

Aspects of various embodiments discussed herein may pertain to signaling of pre-emption and/or puncturing events and their usage in UE and gNB procedures. It has been observed that there may be cases when taking into account a pre-emption event in decoding an initial transmission may end up restoring a whole transport block, even without retransmissions in cases of low-to-medium data rates for Quadrature Phase-Shift Keying (QPSK) and Quadrature Amplitude Modulation 16 (QAM16) modulations and/or for relatively short pre-empting signals.

For higher data rate transmissions, the indication may advantageously aid proper soft combining of a corrupted initial transmission and a retransmission. Proper soft combining may at least include flushing corrupted soft bits from a buffer.

As a special case, pre-emption of retransmission resources may also be possible. For example, if an initial transmission fails due to channel conditions (typical in about 10% of cases with link adaptation), but the retransmission is pre-empted, a pre-emption indication may help to identify which soft metrics should be combined and which should not.

Therefore, there are cases when a pre-emption indication may be beneficial along with retransmission of impacted data, and cases when the pre-emption may restore decoding without additional retransmissions. In that sense, the mechanisms of indication and retransmission may be decoupled.

With respect to indication channels and timing, there may be no new channel to carry a pre-emption indication. There may instead be two main candidates: conventional UE-specific search space (USS)/common search space (CSS) PDCCH, or group-common PDCCH. Since there may be a lack of agreement as to whether group-common PDCCH has a dedicated structure, or whether there may be merely a DCI format in CSS, as discussed herein, either type of PDCCH may be used.

Various embodiments may pertain to various optional candidates for indication timing, or where in the time domain to transmit the indication signal. In an option 1, an indication may be carried in an impacted slot (e.g., an Nth slot). There may be two flavors of an indication in accordance with option 1.

In an option 1A, the indication may be multiplexed in the same time resources with a pre-empting signal. This may be done by, e.g., allowing UEs to read a DCI scheduling a pre-empting transmission. However, it may not always be possible due to potentially differing numerologies. Therefore, the indication may be TDMed and/or FDMed with a pre-empting transmission.

As an alternative way to alleviate the problem above, a UE may assume the same numerology as that of an impacted transmission in a slot n when blind-detecting the presence of an indication signal within a same slot. In order to provide more flexibility to allow multiplexing between eMBB and URLLC traffic using different numerologies, the numerology of an indication signal may be semi-statically configured by NR SIB, or by higher layers, or by Media Access Control (MAC) Control Elements (CEs), or by a combination of them per bandwidth part to facilitate the presence detection of indication signal.

Option 1A may be attractive for several reasons. Resources for an indication may puncture a PDSCH in a manner similar to the pre-empting signal, and may therefore not require reserved resources solely for the indication. Immediate indication may also be beneficial to aid decoding of an impacted transmission in a self-contained manner. Such immediate indication may be unified with UL pre-emption signaling to stop UL transmissions.

In an option 1B, an indication may be carried by an end-slot PDCCH (in an Nth slot). Although formally this indication may be carried within an impacted slot, there might not be benefits in terms of processing latency and support of self-contained operation. Moreover, resources for such PDCCH may be disposed to either being semi-statically reserved, or dynamically borrowed from shared channel resource elements. Dynamic allocation may be disposed to either puncturing or rate matching. Puncturing may cause issues similar to the pre-emption signal itself unless it is small and distributed so that the impact on effective code rate is minimal. Rate matching may also complicate UE behavior and may not always be possible, depending on transmission parameters.

In an option 2, an indication may be carried by a next slot PDCCH, (e.g., in an N+1 available slot for PDCCH transmission). This option may advantageously accommodate system operation since it may not introduce additional monitoring occasions to UEs and may not require dynamic sharing of resources with shared channels. Additionally, such indication may be combined with scheduling of a retransmission of the impacted data in cases of self-contained operation.

In an option 3, an indication may be carried by a Kth slot PDCCH (e.g., in an N+K slot), where k>1. In such scenarios, there might not be much motivation to have the indication before the originally scheduled HARQ feedback, since there may be little chance to take the indication and potential retransmission into account for generating the feedback.

Figure 9:
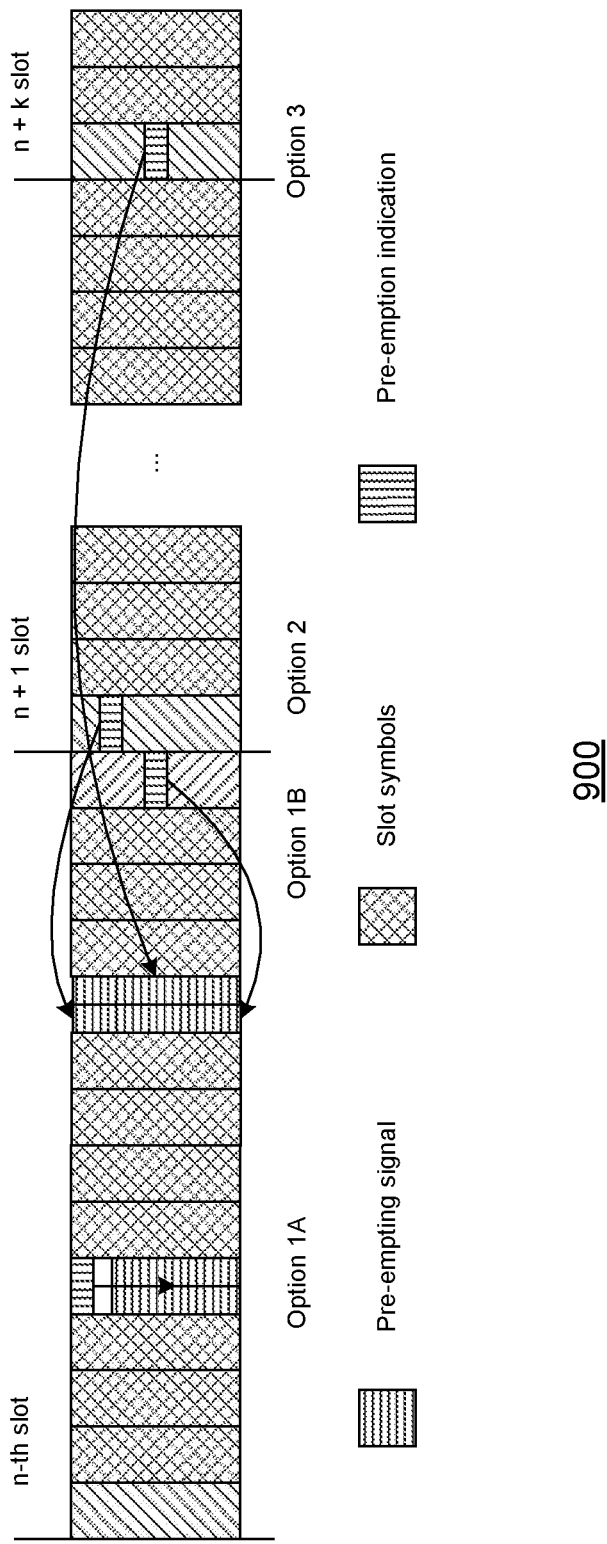
FIG. 9 illustrates a scenario of indication timing and channel options, in accordance with some embodiments of the disclosure.

FIG. 9 illustrates a scenario 900 of indication timing and channel options, in accordance with some embodiments of the disclosure.

In various embodiments, one or more of these options may already be possible by configuration. However, some of them may be disadvantageous. For example, option 1B might not have benefits comparing to other options and might not be used. Although option 1A may also be attractive from the perspective of preserving processing latency, there may be increased UE complexity and/or power consumption concerned with an increased PDCCH monitoring rate. Additionally, if there are to be no new channels for the indication, usage of PDCCH for such an indication will substantially reduce useful resources for a pre-empting transmission (e.g., URLLC).

For option 2 and option 3, HARQ feedback timing may be updated further. This may be achieved via implicit update of the HARQ-ACK feedback timing to a next available opportunity for HARQ-ACK transmission, or may be explicitly conveyed as part of a preemption indication itself (e.g., the DCI conveying the preemption indication signal). In some embodiments, assuming a UE receives a PDSCH in a slot N and a preemption indication in a slot N+1 together with a subsequent PDSCH retransmission, HARQ-ACK for the PDSCH Transport Block (TB) may be deferred and may be decided at least in accordance to slot N+1 where the UE may receive the preemption indicator and/or the retransmitted PDSCH, due to the extra processing delay associated with the preemption indicator.

Note that in cases in which PDCCH is used to carry indication signal, search space including aggregation levels, the number of blind decoding attempts may be configured by higher layers via NR minimum system information (MSI), NR remaining minimum system information (RMSI), NR SIB, or RRC signaling. It may be desirable to limit the search space or the number of blind decoding attempts, which may advantageously reduce a UE power consumption.

In general, a decision on an indication channel may depend on supported retransmission mechanisms. However, as discussed herein, there may be benefits to having a dedicated indication mechanism decoupled from the retransmissions. Therefore, option 1A and option 2 may be considered for singling a dedicated pre-emption signal. The indication channel itself may be a compact DCI format (e.g., having 10 to 20 bits), scheduled either in common search space or in UE-specific search space.

Regarding indicated information, which channel will carry the pre-emption indication and what is actually signaled in the pre-emption indication may be provided. In various embodiments, two approaches may be used: indication of pre-empted physical resources, and indication of pre-empted code blocks (CBs) and/or code block groups (CBGs).

In some embodiments, some approaches may use indication of pre-empted physical resources. For indication of pre-empted physical resources, an indication may be both UE-specific and group-specific (e.g., broadcast), since the notion of physical resources may be common for all UEs configured with a given numerology. In case there are affected UEs with different numerologies, the indication may be sent for all different numerologies, or for one "default" numerology, which may be used to derive the affected resources in any other numerology.

The possibility of indicating pre-empted resources in a broadcast manner may be beneficial in terms of resource efficiency, especially in cases in which the pre-empting transmission (e.g., URLLC) may affect multiple scheduled UEs. In such cases, a broadcast indication may require less system resources to deliver a pre-emption information. As a special case, a pre-emption signal may affect resources carrying system information blocks. In such cases, the common pre-emption indication may help to decode messages by adjusting decoding metrics.

Indication of pre-empted physical resources may comprise monitoring of an indication and determination of indication content.

Monitoring of the pre-emption indication may be configurable through semi-static signaling according to a presence of and/or support for low latency services and related UE capabilities. However, even if the pre-emption monitoring is configured, it may be desirable to minimize a blind decoding overhead. Both the preservation of "pre-emption DCI" design and "pre-emption DCI" monitoring triggering conditions may be factors considered in preserving blind decoding complexity.

Regarding blind decoding preserving "pre-emption DCI" design, DCI carrying a pre-emption indication may be designed to cause minimum additional UE effort to decode. For example, a size of the DCI may be the one of the sizes commonly used by gNB for typical operation (e.g., for scheduling of typical DL and UL transmissions) in order to avoid adding blind decoding hypotheses. In such cases, the differentiation of this DCI may be done by scrambling (e.g., Radio Network Temporary Identifier (RNTI)), or by the content (e.g., by introducing a DCI type header in DCI and reserving one dedicated value for pre-emption indication signaling).

Moreover, any other common DCI, which may be disposed to being monitored by active UEs may carry the indication. For example, DCI or group-common PDCCH with slot format indication may carry the indication.

Regarding "Pre-emption DCI" monitoring triggering conditions, a UE may be triggered to search for a pre-emption indication merely if decoding of one of the code blocks fails, in order to realize the reason of the failure. In some embodiments, a gNB may indicate (e.g., in SIB information) to on-off (e.g., turn on or turn off) the blind decoding operation for monitoring "Pre-emption DCI." Moreover, a UE may autonomously decide whether to search for the pre-emption DCI merely when the decoding failure happens for a reception, in order to save UE power. The triggering condition may merely work if there is a sufficient latency budget between the affected channel and the pre-emption indication.

In a more general case, a pre-emption indication may be monitored merely if there are active HARQ processes at a UE, and/or it is enabled by a gNB (e.g., by using SIB or dedicated RRC signaling).

From the discussed aspects of pre-emption monitoring, it can be concluded that there are multiple mechanisms to do it efficiently without causing additional complexity at the UE.

Regarding determining the indication content, as discussed herein, an advantage of an indication in terms of physical resources is the possibility of transmitting it in a groupcast and/or broadcast manner that may be beneficial in cases of multiple affected UEs (e.g., multiple low data rate UEs being served). Notably, when multiple low data rate UEs are served simultaneously, their transmissions may well contain only one code block, or a few code blocks. In such scenarios, there may be clear benefits to indicating pre-empted resources even without retransmissions, since the likelihood of successful TB decoding may increase substantially in cases of low-to-medium code rates.

However, relatively large signaling overhead may pertain to such approaches, due to potentially more signaling combinations comparing to CBG-based indications. Accordingly, time domain resources and frequency domain may be analyzed separately, as discussed herein. Some considerations on spatial domain may also be analyzed.

In the time domain, pre-empting transmissions may affect one or more portions of a slot, with up to symbol-level granularity. That may correspond to at most 14 bits to indicate as a bitmap for 14-symbol slots, and 7 bits to indicate as a bitmap for 7-symbols slots. However, a typical PDSCH might be scheduled starting from symbols 1, 2, or 3 to avoid overlap with a PDCCH region. Therefore, an indication might not signal potential puncturing in a PDCCH region, further reducing a signaling size.

Additionally, since a pre-emption indication may be signaled in later slots, a mechanism to link a time instance of an indication with an impacted slot may be desirable. Some embodiments may configure a fixed timing relationship. However, this may impose scheduling restrictions and may lead a gNB to reserve control resources for such an indication in case of pre-emption. In that sense, at least minimum flexibility to indicate the impacted slot may be desirable, e.g., 1 to 2 bits to indicate an offset between an indication instance and a puncturing instance.

Another option (also applicable for CBG-based indications) may be to constrain a preemption indication to be transmitted in a next available slot for PDCCH (excluding, say, UL slots) if the indication is not transmitted together with a retransmission grant that may follow the HARQ Round Trip Time (RTT) or precede ACK/Negative Acknowledgement (NACK) transmission from the UE. Thus, a preemption indication may either be transmitted in a next available PDCCH monitoring occasion for one or more affected UEs, or as part of a retransmission assignment that may follow a HARQ RTT or precede ACK/NACK transmission from the UE. Thus, for an indication of pre-empted physical resources, a time domain indication may merely indicate affected symbols within a slot. In some embodiments, potential reduction of signaling may be done by increasing a granularity of indication and/or introducing a limited set of puncturing patterns.

Note that in cases when symbol level granularity is used for time domain pre-emptying indications, symbol duration may be defined in accordance with a reference numerology or numerology which may be configured for PDCCH carrying pre-emptying indication signal.

In the frequency domain, signaling of pre-empted resources may be more complicated due to various NR features, which may include wideband operation with multiples PRBs, frequency selective scheduling with fine granularity, and/or distributed frequency allocation.

Taking into account that a pre-empting transmission may typically be wideband (e.g., URLLC), a coarse frequency domain granularity may be enough for indication. Therefore, at least the affected bandwidth parts may be indicated. For finer granularity of impacted resources within a BW part, an indication may be in terms of the Resource Block Groups (RBGs) that may be defined and used for frequency domain resource allocation of PDSCH, with size of "P" PRBs depending on a BW of a pertinent BW part, or even in terms of a bandwidth part or a sub-band. In some embodiments, a size of a sub-band may be either predetermined (e.g., fixed by specification) or may be a scalable value based on the system bandwidth and a reference value.

A frequency granularity may be defined in accordance with a reference numerology or a numerology which is configured for PDCCH carrying a pre-empting indication signal.

For the spatial domain, pre-emption might by default puncture all layers in order to avoid potential impact on URLLC transmission. However, for forward compatibility, an indication of which layers or antenna ports have been preempted may also be signaled.

In some embodiments, some approaches may use indication of pre-empted CBs and/or CBGs. For indication of pre-empted CBs and/or CBGs, such mechanisms may be based on potential reuse of a framework of CBG-based HARQ retransmissions and multi-bit HARQ feedback support. Such mechanism may merely be supported in a UE-specific manner since they may use a particular UE's transmission code-block segmentation assumptions. Therefore, signaling of pre-emption indication to all impacted UEs may introduce noticeable overhead. However, if such pre-emption indication is combined with scheduling of retransmissions following HARQ RTT, the overhead may be acceptable.

The indication itself may be carried in DCI scheduling retransmissions. The DCI should carry at least one bit of information which indicates whether the previous occasion of CBG was pre-empted or not in order to adjust decoding metrics accordingly.

Figure 10:
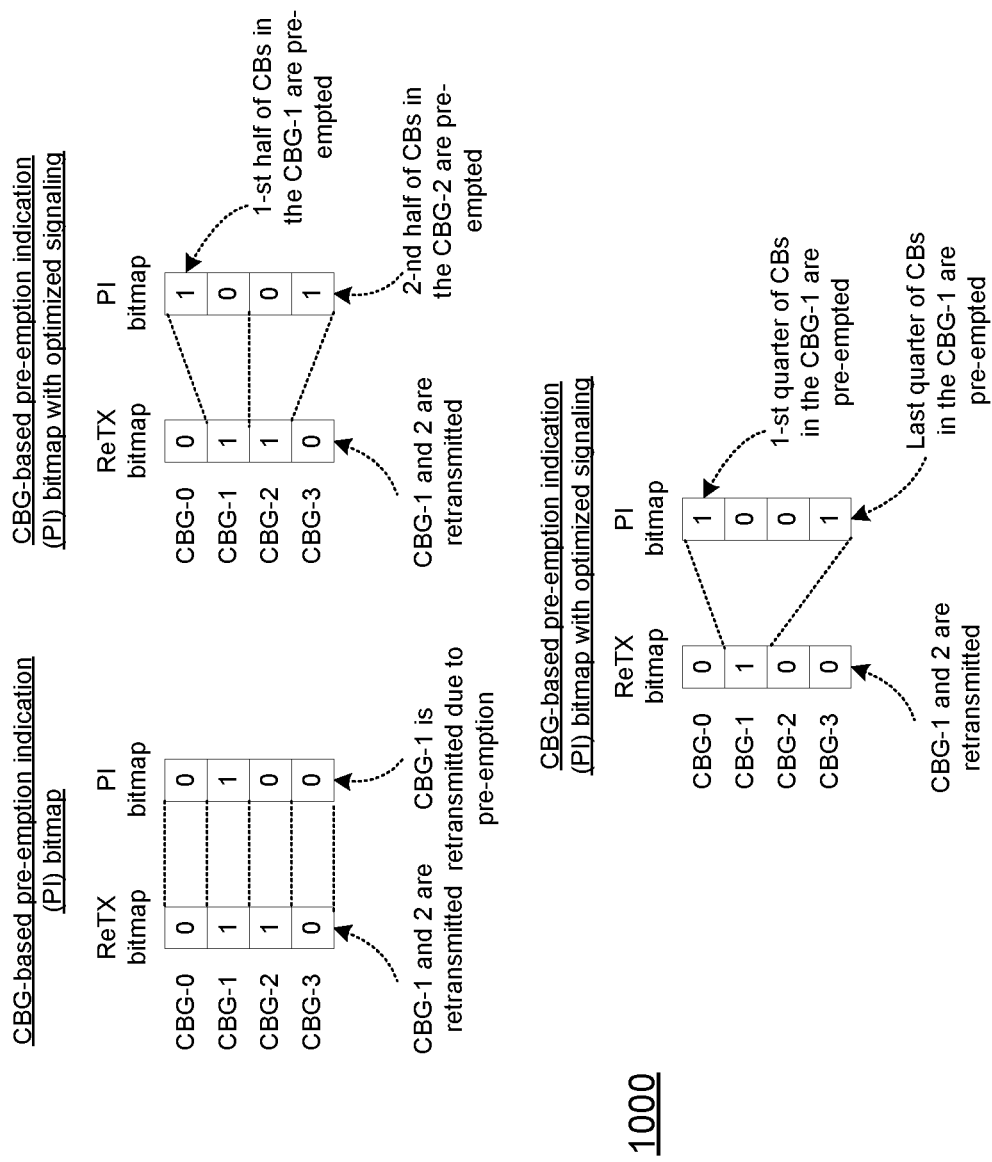
FIG. 10 illustrates a scenario of Code Block Group (CBG) based pre-emption indication options, in accordance with some embodiments of the disclosure.

In a more general case, a bitmap over retransmitted CBGs to indicate whether a CBG was preempted or not may be signaled. For example, if there are 4 CBGs configured to a UE, then a bitmap of 4 bits may signal which CBGs are retransmitted for a current HARQ process. Then, for each of the retransmitted CBG, a bit indicating the pre-emption may be signaled. This may be done by a bitmap of the same size as the number of configured CBGs. Further, this bitmap may be re-interpreted depending on how many CBGs are retransmitted. If only one CBG or a few CBGs are retransmitted, then the pre-emption indication bitmap may be used to indicate which code-blocks of the code block group were pre-empted. FIG. 10 illustrates a scenario 1000 of Code Block Group (CBG) based pre-emption indication options, in accordance with some embodiments of the disclosure.

Alternatively, a PI field may indicate one out of pre-defined pre-empted pattern for a CBG. As one example, a 2-bit field may be used to indicate the 1st half, the 2nd half, whole, and reserved. Additionally, to address the concern of control signaling overhead, one bit indicating pre-emption can be also considered. It implies, that a gNB needs to indicate the pre-emption to all failed CBGs if at least one CBG is pre-empted by the URLLC transmission.

Regarding retransmission of Impacted Data, in some cases, when gNB expects that the impacted transmission may be decoded by the receivers taking into account only pre-emption indication (e.g., due to low Modulation and Coding Scheme (MCS)), the gNB may refuse retransmission of the impacted data without waiting for actual feedback. In other cases, the gNB may decide to retransmit the affected CBGs and/or TB in order not to wait for the feedback. In both cases, the UE processing timeline should be carefully studied. Current agreements assume that the timing between PDSCH reception and HARQ feedbacks transmission can be dynamically signaled in DCI. When receiving the DCI, the UE can use the whole response delay for processing of the original TB. In case the CBG retransmission for the same HARQ process is scheduled before the time instance of response (also sometimes referred as a "subsequent transmission"), various scenarios may be considered.

In a scenario 1, a UE may keep a configured HARQ timing for an original TB. In a scenario 1a, the UE may transmit the first HARQ feedback based on decoding results without taking into account the retransmitted CBGs, and the UE may transmit the second HARQ feedback taking into account the retransmitted CBGs. In a scenario 1b, the UE may transmit one HARQ feedback based on decoding results, taking into account the retransmitted CBGs.

Figure 11A:
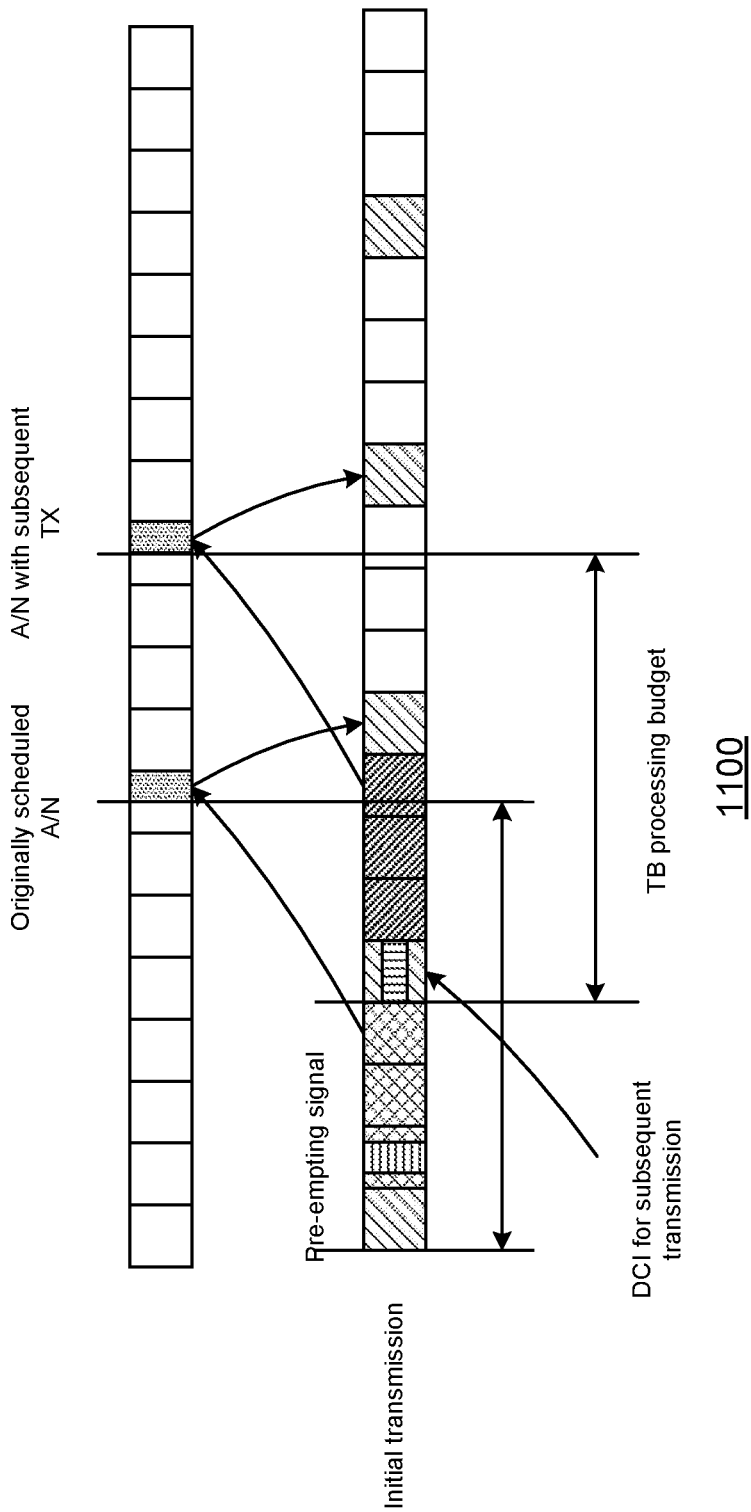
FIGS. 11A-11B illustrate scenarios of processing timelines in cases of subsequent transmission and one-slot ACK/Negative Acknowledgement (NACK) delay, in accordance with some embodiments of the disclosure.
Figure 11B:
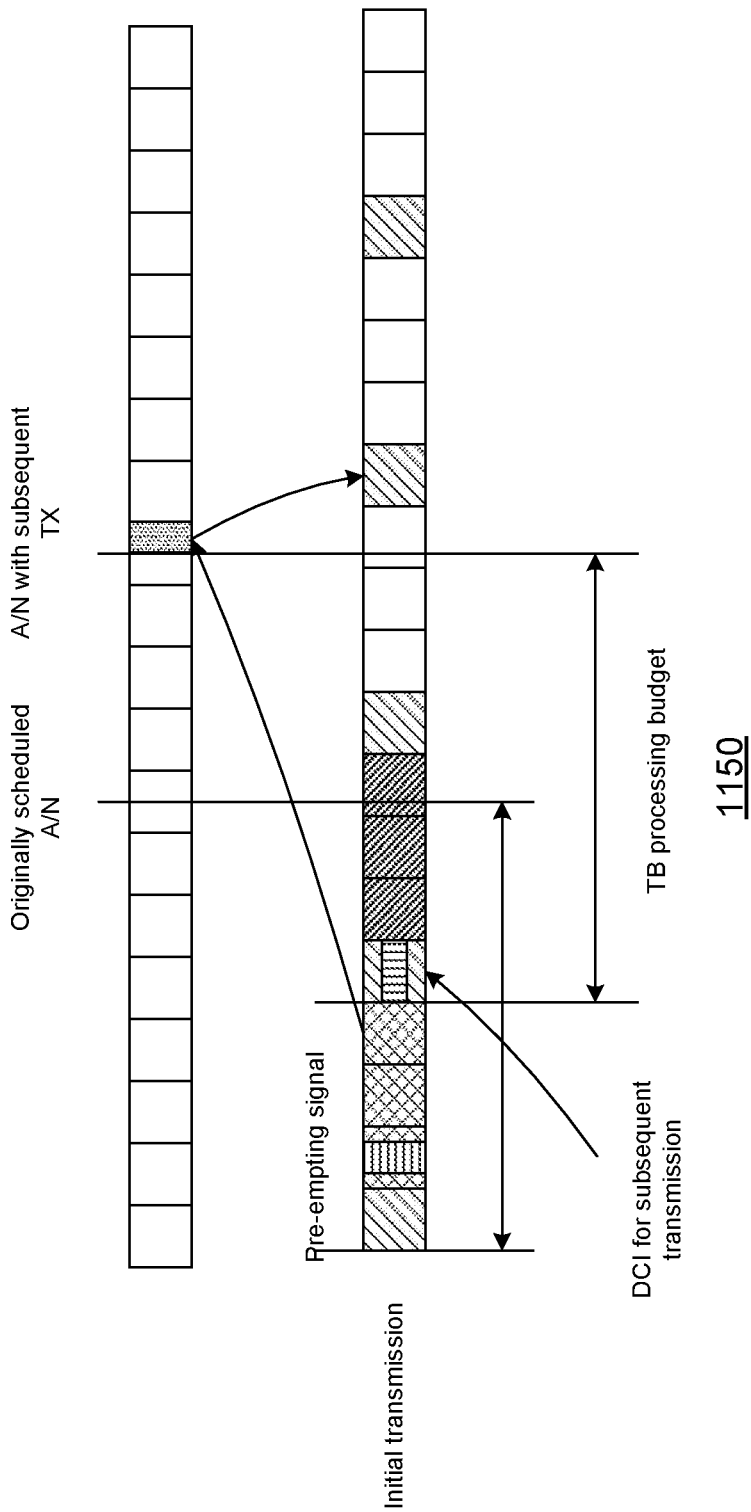

FIGS. 11A-11B illustrate a scenarios 1100 and a scenario 1150 of processing time-lines in cases of subsequent transmission and one-slot ACK/Negative Acknowledgement (NACK) delay, in accordance with some embodiments of the disclosure. Scenarios 1100 and scenario 1150 may correspond with scenario 1a and scenario 1b, respectively.

In a scenario 2, a UE may update a configured HARQ timing for the original TB. In a scenario 2a, the UE may transmit one HARQ feedback in the time instance configured by the DCI scheduling the CBG retransmission based on decoding result taking into account the retransmitted CBGs.

Figure 12:
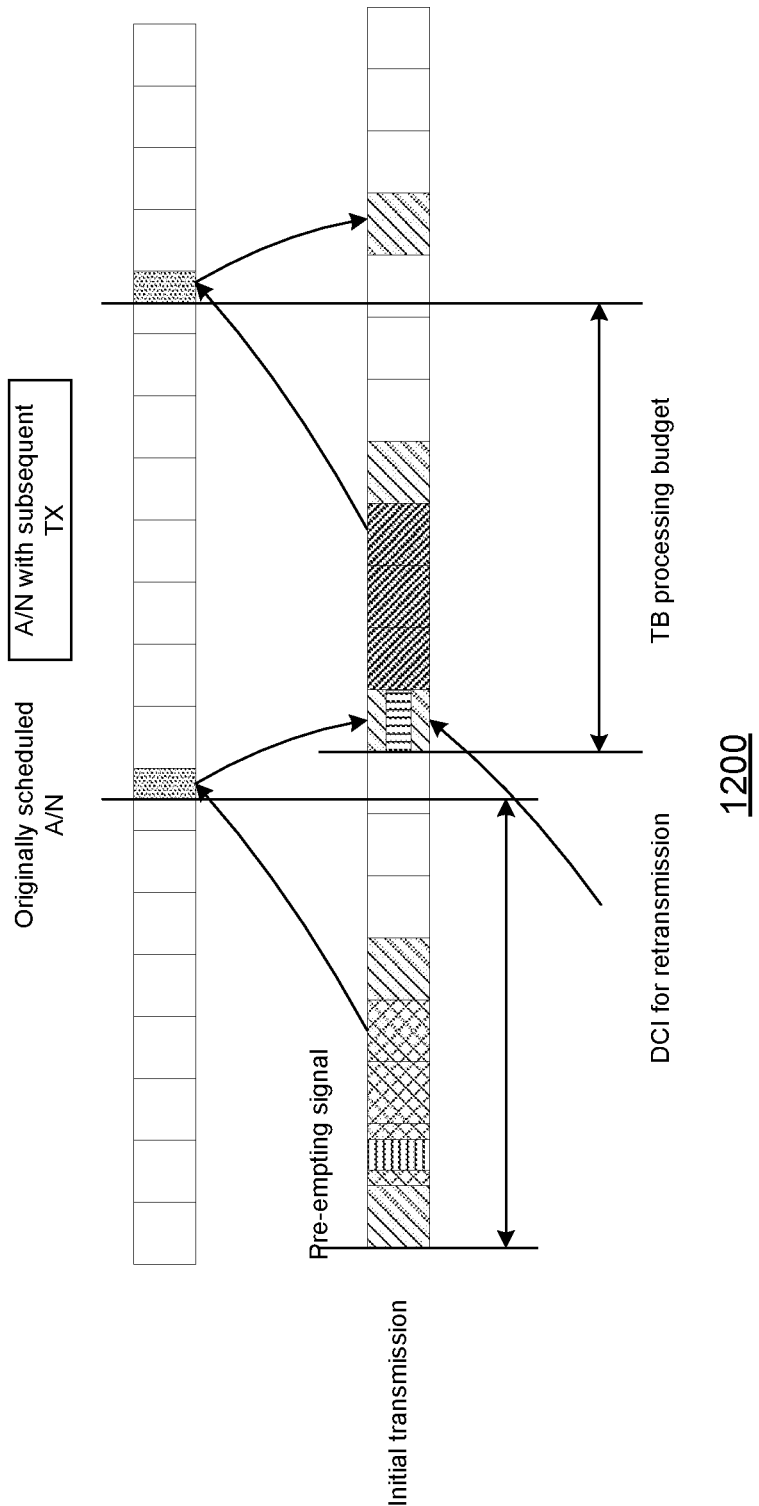
FIG. 12 illustrates a scenario of conventional Round Trip Time (RTT) with CBG-based retransmissions and one-slot ACK/NACK delay, in accordance with some embodiments of the disclosure.

FIG. 12 illustrates a scenario 1200 of conventional Round Trip Time (RTT) with CBG-based retransmissions and one-slot ACK/NACK delay, in accordance with some embodiments of the disclosure. Scenario 1200 may correspond with scenario 2a.

Note that depending on UE implementation it may not be possible to follow scenarios 1b and 2a since a UE may have processing delays less than the initial HARQ response delay.

Further, in a variant of Scenario 1a, a one-bit indication in DCI scheduling the retransmission prior to ACKNACK feedback may be used by the gNB to indicate suspension of the ACK/NACK transmission corresponding to the initial transmission (e.g., drop the ACK/NACK transmission according to the initial HARQ timing) and instead only transmit ACK/NACK feedback according to a HARQ feedback timing indicated in the DCI scheduling the retransmission. Such an indication may allow the gNB to avoid an additional ACK/NACK transmission (e.g., when most of the CBs or CBGs might have been preempted).

On the other hand, such retransmission prior to HARQ RTT might not be used. An advantage of such subsequent transmission may be latency reduction (as in FIGS. 11A-11B), where the latency increases at least by one slot comparing to the original timeline without pre-emption events (as in FIG. 12). For a large initial RTT, the latency savings may be significant; however, for large RTT, additional latency savings may not be as advantageous. In embodiments that already support flexible timing relationships including HARQ RTT, for eMBB, UEs with latency demands may simply be configured with shorter RTT and any retransmission may follow ACK/NACK feedback. This may avoid requiring eMBB UEs to reprocess PDSCH CBGs in the middle of an existing HARQ time-line, or to shift the timelines by one or more slots.

Figure 13:
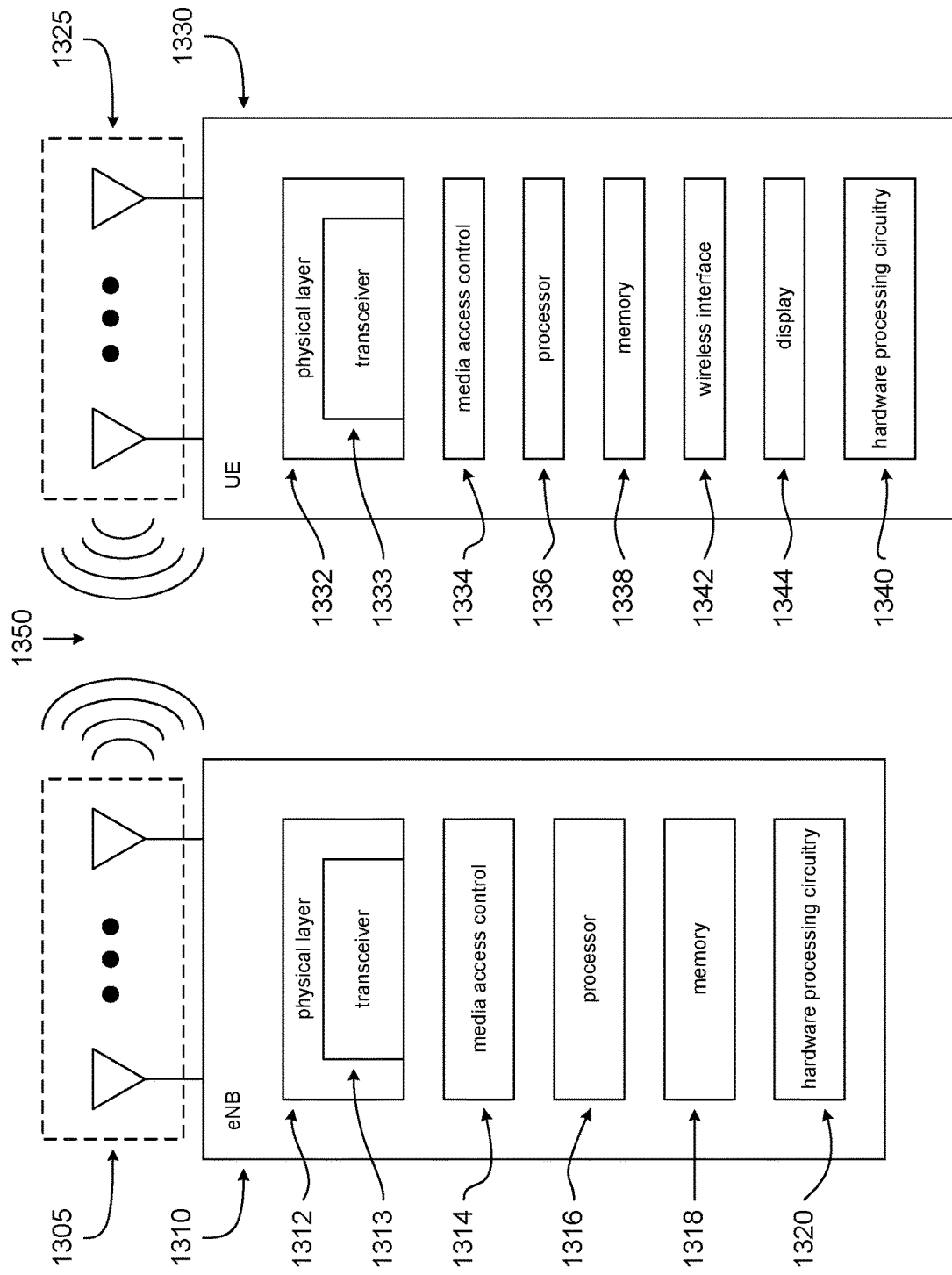
FIG. 13 illustrates an Evolved Node-B (eNB) and a User Equipment (UE), in accordance with some embodiments of the disclosure.

FIG. 13 illustrates an eNB and a UE, in accordance with some embodiments of the disclosure. FIG. 13 includes block diagrams of an eNB 1310 and a UE 1330 which are operable to co-exist with each other and other elements of an LTE network. High-level, simplified architectures of eNB 1310 and UE 1330 are described so as not to obscure the embodiments. It should be noted that in some embodiments, eNB 1310 may be a stationary non-mobile device.

eNB 1310 is coupled to one or more antennas 1305, and UE 1330 is similarly coupled to one or more antennas 1325. However, in some embodiments, eNB 1310 may incorporate or comprise antennas 1305, and UE 1330 in various embodiments may incorporate or comprise antennas 1325.

In some embodiments, antennas 1305 and/or antennas 1325 may comprise one or more directional or omni-directional antennas, including monopole antennas, dipole antennas, loop antennas, patch antennas, microstrip antennas, coplanar wave antennas, or other types of antennas suitable for transmission of RF signals. In some MIMO (multiple-input and multiple output) embodiments, antennas 1305 are separated to take advantage of spatial diversity.

eNB 1310 and UE 1330 are operable to communicate with each other on a network, such as a wireless network. eNB 1310 and UE 1330 may be in communication with each other over a wireless communication channel 1350, which has both a downlink path from eNB 1310 to UE 1330 and an uplink path from UE 1330 to eNB 1310.

As illustrated in FIG. 13, in some embodiments, eNB 1310 may include a physical layer circuitry 1312, a MAC (media access control) circuitry 1314, a processor 1316, a memory 1318, and a hardware processing circuitry 1320. A person skilled in the art will appreciate that other components not shown may be used in addition to the components shown to form a complete eNB.

In some embodiments, physical layer circuitry 1312 includes a transceiver 1313 for providing signals to and from UE 1330. Transceiver 1313 provides signals to and from UEs or other devices using one or more antennas 1305. In some embodiments, MAC circuitry 1314 controls access to the wireless medium. Memory 1318 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Hardware processing circuitry 1320 may comprise logic devices or circuitry to perform various operations. In some embodiments, processor 1316 and memory 1318 are arranged to perform the operations of hardware processing circuitry 1320, such as operations described herein with reference to logic devices and circuitry within eNB 1310 and/or hardware processing circuitry 1320.

Accordingly, in some embodiments, eNB 1310 may be a device comprising an application processor, a memory, one or more antenna ports, and an interface for allowing the application processor to communicate with another device.

As is also illustrated in FIG. 13, in some embodiments, UE 1330 may include a physical layer circuitry 1332, a MAC circuitry 1334, a processor 1336, a memory 1338, a hardware processing circuitry 1340, a wireless interface 1342, and a display 1344. A person skilled in the art would appreciate that other components not shown may be used in addition to the components shown to form a complete UE.

In some embodiments, physical layer circuitry 1332 includes a transceiver 1333 for providing signals to and from eNB 1310 (as well as other eNBs). Transceiver 1333 provides signals to and from eNBs or other devices using one or more antennas 1325. In some embodiments, MAC circuitry 1334 controls access to the wireless medium. Memory 1338 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Wireless interface 1342 may be arranged to allow the processor to communicate with another device. Display 1344 may provide a visual and/or tactile display for a user to interact with UE 1330, such as a touch-screen display. Hardware processing circuitry 1340 may comprise logic devices or circuitry to perform various operations. In some embodiments, processor 1336 and memory 1338 may be arranged to perform the operations of hardware processing circuitry 1340, such as operations described herein with reference to logic devices and circuitry within UE 1330 and/or hardware processing circuitry 1340.

Accordingly, in some embodiments, UE 1330 may be a device comprising an application processor, a memory, one or more antennas, a wireless interface for allowing the application processor to communicate with another device, and a touch-screen display.

Elements of FIG. 13, and elements of other figures having the same names or reference numbers, can operate or function in the manner described herein with respect to any such figures (although the operation and function of such elements is not limited to such descriptions). For example, FIGS. 13 and 17-18 also depict embodiments of eNBs, hardware processing circuitry of eNBs, UEs, and/or hardware processing circuitry of UEs, and the embodiments described with respect to FIG. 13 and FIGS. 13 and 17-18 can operate or function in the manner described herein with respect to any of the figures.

In addition, although eNB 1310 and UE 1330 are each described as having several separate functional elements, one or more of the functional elements may be combined and may be implemented by combinations of software-configured elements and/or other hardware elements. In some embodiments of this disclosure, the functional elements can refer to one or more processes operating on one or more processing elements. Examples of software and/or hardware configured elements include Digital Signal Processors (DSPs), one or more microprocessors, DSPs, Field-Programmable Gate Arrays (FPGAs), Application Specific Integrated Circuits (ASICs), Radio-Frequency Integrated Circuits (RFICs), and so on.

Figure 14:
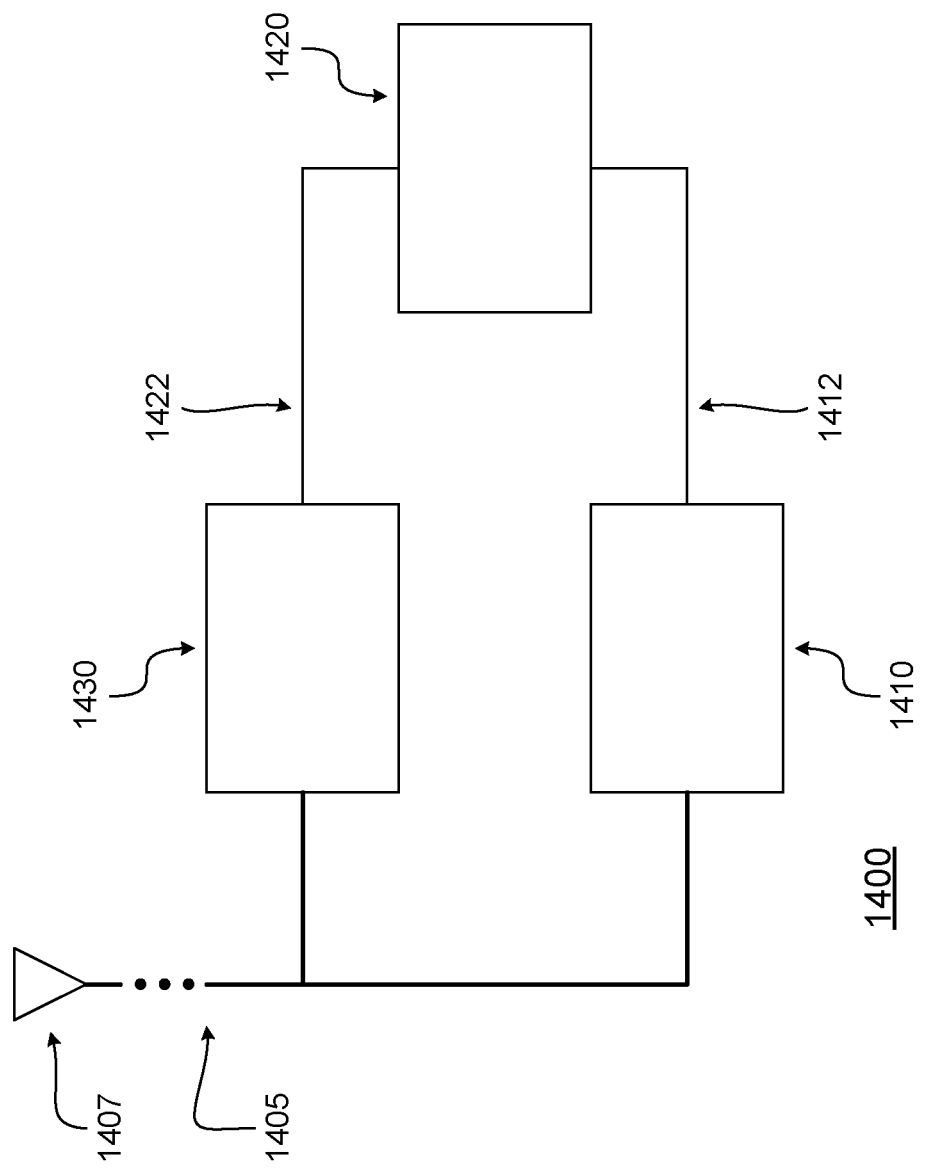
FIG. 14 illustrates hardware processing circuitries for a UE for handling PUCCH collision for mini-slot and slot based transmission for NR and for signaling of pre-emption and/or puncturing events and their usage in UE and gNB procedures, in accordance with some embodiments of the disclosure.

FIG. 14 illustrates hardware processing circuitries for a UE for handling PUCCH collision for mini-slot and slot based transmission for NR and for signaling of pre-emption and/or puncturing events and their usage in UE and gNB procedures, in accordance with some embodiments of the disclosure. With reference to FIG. 13, a UE may include various hardware processing circuitries discussed herein (such as hardware processing circuitry 1400 of FIG. 14), which may in turn comprise logic devices and/or circuitry operable to perform various operations. For example, in FIG. 13, UE 1330 (or various elements or components therein, such as hardware processing circuitry 1340, or combinations of elements or components therein) may include part of, or all of, these hardware processing circuitries.

In some embodiments, one or more devices or circuitries within these hardware processing circuitries may be implemented by combinations of software-configured elements and/or other hardware elements. For example, processor 1336 (and/or one or more other processors which UE 1330 may comprise), memory 1338, and/or other elements or components of UE 1330 (which may include hardware processing circuitry 1340) may be arranged to perform the operations of these hardware processing circuitries, such as operations described herein with reference to devices and circuitry within these hardware processing circuitries. In some embodiments, processor 1336 (and/or one or more other processors which UE 1330 may comprise) may be a baseband processor.

Returning to FIG. 14, an apparatus of UE 1330 (or another UE or mobile handset), which may be operable to communicate with one or more eNBs on a wireless network, may comprise hardware processing circuitry 1400. In some embodiments, hardware processing circuitry 1400 may comprise one or more antenna ports 1405 operable to provide various transmissions over a wireless communication channel (such as wireless communication channel 1350). Antenna ports 1405 may be coupled to one or more antennas 1407 (which may be antennas 1325). In some embodiments, hardware processing circuitry 1400 may incorporate antennas 1407, while in other embodiments, hardware processing circuitry 1400 may merely be coupled to antennas 1407.

Antenna ports 1405 and antennas 1407 may be operable to provide signals from a UE to a wireless communications channel and/or an eNB, and may be operable to provide signals from an eNB and/or a wireless communications channel to a UE. For example, antenna ports 1405 and antennas 1407 may be operable to provide transmissions from UE 1330 to wireless communication channel 1350 (and from there to eNB 1310, or to another eNB). Similarly, antennas 1407 and antenna ports 1405 may be operable to provide transmissions from a wireless communication channel 1350 (and beyond that, from eNB 1310, or another eNB) to UE 1330.

Hardware processing circuitry 1400 may comprise various circuitries operable in accordance with the various embodiments discussed herein. With reference to FIG. 14, hardware processing circuitry 1400 may comprise a first circuitry 1410, a second circuitry 1420, and/or a third circuitry 1430.

In a variety of embodiments, first circuitry 1410 may be operable to process one or more configuration transmissions from the gNB carrying a rule for UL collisions. First circuitry 1410 may also be operable to process a first DL transmission and a second DL transmission. Second circuitry 1420 may be operable to identify a first UL transmission for the first DL transmission and a second UL transmission for the second DL transmission, the first UL transmission overlapping with the second UL transmission in at least one OFDM symbol. First circuitry 1410 may be operable to provide indicator information regarding the first DL transmission and/or the second DL transmission to second circuitry 1420. Third circuitry 1430 may be operable to generate the first UL transmission and/or the second UL transmission in accordance with the rule for UL collisions. First circuitry 1410 may be operable to provide information regarding the rule for UL collisions to second circuitry 1420, and/or (through second circuitry 1420) to third circuitry 1430. Hardware processing circuitry 1400 may also comprise an interface for receiving configuration transmissions and DL transmissions from a receiving circuitry and for sending UL transmissions to a transmission circuitry.

In some embodiments, the first UL transmission may be dropped in accordance with the rule for UL collisions. For some embodiments, the first UL transmission may be delayed in accordance with the rule for UL collisions. In some embodiments, the first UL transmission may be one of: a PUSCH transmission, or a PUCCH transmission, and the second UL transmission may be a PUCCH transmission.

For some embodiments, the first UL transmission may be to carry a HARQ ACK for the first DL transmission, the second UL transmission may be to carry a HARQ ACK for the second DL transmission, and/or the first UL transmission may be dropped in accordance with the rule for UL collisions. In some embodiments, the rule for UL collisions may be defined in accordance with a timing of DL transmission assignment. For some embodiments, the rule for UL collisions may be defined in accordance with a duration of the first DL transmission and/or a duration of the second DL transmission.

In some embodiments, the rule for UL collisions may be defined in accordance with a UCI type for the first UL transmission and/or a UCI type for the second UL transmission. For some embodiments, the first UL transmission may be a slot-based transmission, and the first UL transmission may be delayed in accordance with the rule for UL collisions when the first UL transmission is to carry HARQ ACK feedback. In some embodiments, the first UL transmission may be a slot-based transmission, the first UL may be to carry HARQ ACK feedback for first DL transmission, and the first UL transmission may be punctured in accordance with the rule for UL collisions.

For some embodiments, a UCI of either the first UL transmission or the second UL transmission is a joint UCI. In some embodiments, the first UL transmission may be a slot-based transmission, the second UL transmission may be a mini-slot-based transmission, and the first UL transmission may be transmitted in frequency resources contiguous to the second UL transmission. For some embodiments, the rule for UL collisions may be defined in accordance with a set of configured resources continuous in frequency.

In some embodiments, the first UL transmission may be dropped in accordance with the rule for UL collisions when resources for the first UL transmission are not contiguous with resources for the second UL transmission. For some embodiments, the second UL transmission may be a mini-slot-based transmission, the second UL transmission may comprise one or more bundled HARQ ACK bits and/or one or more compressed HARQ ACK bits. In some embodiments, the first UL transmission may be a PUCCH transmission and is associated with a first BPL, the second UL transmission may be a PUCCH transmission and is associated with a second BPL, and the first UL transmission and the second UL transmission may be transmitted simultaneously.

In a variety of embodiments, first circuitry 1410 may be operable to process one or more configuration transmissions from the gNB carrying indicators of one or more pre-emption conditions. Second circuitry 1420 may be operable to identify a received PDCCH transmission carrying a pre-emption indication in accordance with the one or more pre-emption conditions. First circuitry 1410 may be operable to provide information regarding the one or more pre-emption conditions to second circuitry 1420 via interface 1412. Hardware circuitry 1400 may also comprise an interface for receiving configuration transmissions and PDCCH transmissions.

In some embodiments, the one or more preemption conditions may comprise a monitoring activation condition and/or a triggering condition. For some embodiments, wherein the triggering condition may comprise a failure to decode a code block of an ongoing HARQ process. In some embodiments, the triggering condition may comprise a presence of an active HARQ process.

For some embodiments, the pre-emption indication may be carried by a dedicated DCI format. In some embodiments, a CRC of DCI carrying pre-emption indication may be scrambled with a dedicated RNTI. For some embodiments, the pre-emption indication may carry an indicator of an offset to increase HARQ feedback delay for a corresponding pre-empted process.

In some embodiments, the pre-emption indication may be a field in a DCI scheduling a retransmission for an impacted HARQ process. For some embodiments, the pre-emption indication may be a bitmap with a size corresponding to one or more CBGs in a given HARQ process. In some embodiments, one or more bits of the bitmap may indicate whether one or more corresponding CBGs is pre-empted in a previous scheduling occasion of a current HARQ process.

For some embodiments, one or more bits of the bitmap may apply to one or more CBs in one or more corresponding CBGs. In some embodiments, the pre-emption indication may signal one or more pre-empted physical resources. For some embodiments, a time domain part of the pre-emption indication may be a bitmap of length 14 bit over symbols of an impacted slot, the bitmap having a length of 14 bits.

In some embodiments, the bitmap may not include symbols carrying PDCCH. For some embodiments, a granularity of indication may depend upon a configured slot duration. In some embodiments, a time-domain part of the pre-emption indication is an index of a preconfigured pattern in a set.

For some embodiments, a frequency-domain part of the pre-emption indication is a bitmap over a PRB group. In some embodiments, a frequency-domain part of the pre-emption indication is a bandwidth part index. For some embodiments, a spatial-domain part of the pre-emption indication is one of: a layer, or a set of one or more antenna port indices. In some embodiments, a scheduling of one or more pre-empted CBGs may be independent of a HARQ feedback timeline of a pre-empted HARQ process.

In some embodiments, first circuitry 1410, second circuitry 1420, and/or third circuitry 1430 may be implemented as separate circuitries. In other embodiments, first circuitry 1410, second circuitry 1420, and/or third circuitry 1430 may be combined and implemented together in a circuitry without altering the essence of the embodiments.

Figure 15:
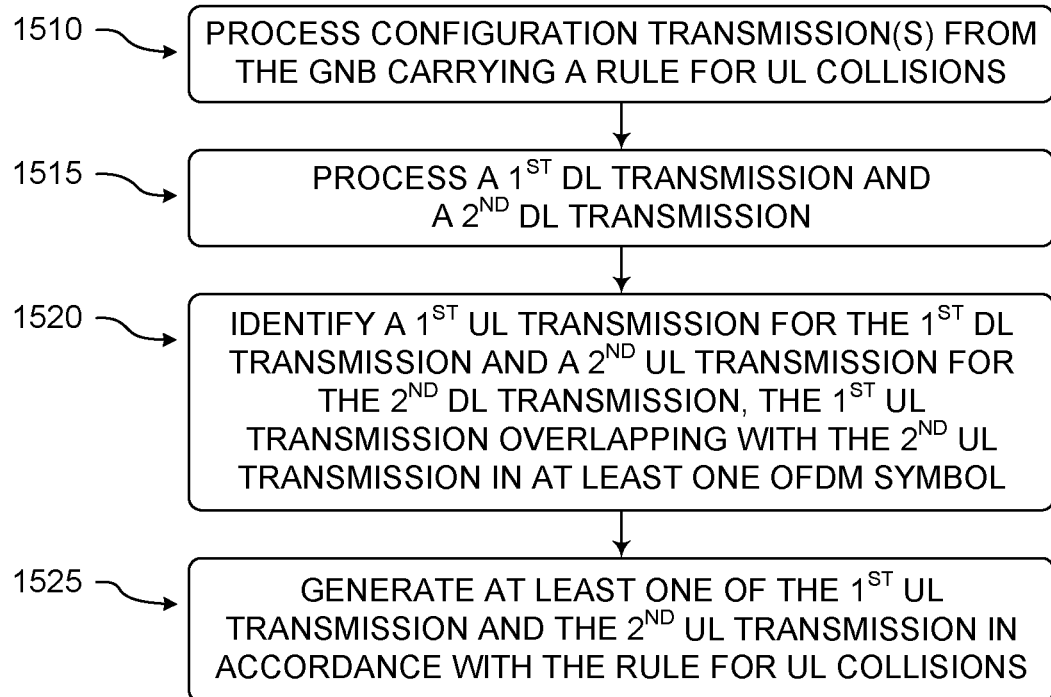
FIG. 15 illustrates methods for a UE for handling PUCCH collision for mini-slot and slot based transmission for NR, in accordance with some embodiments of the disclosure.
Figure 16:
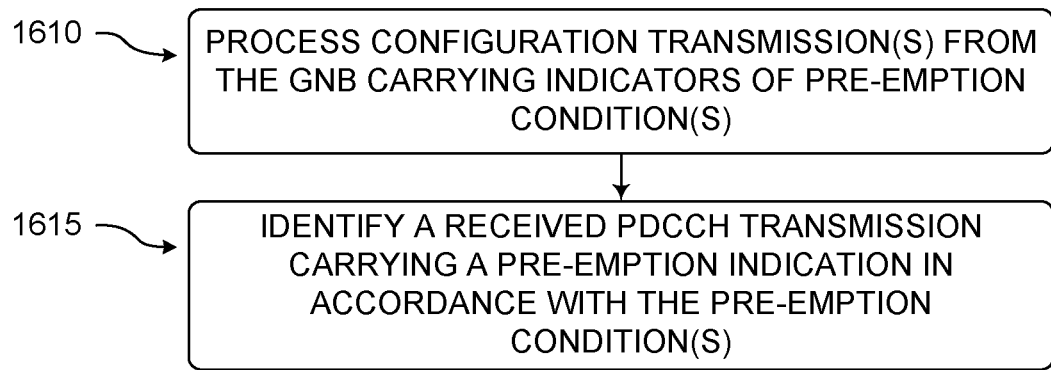
FIG. 16 illustrates methods for a UE signaling of pre-emption and/or puncturing events and their usage in UE and gNB procedures, in accordance with some embodiments of the disclosure.

FIG. 15 illustrates methods for a UE for handling PUCCH collision for mini-slot and slot based transmission for NR, in accordance with some embodiments of the disclosure. FIG. 16 illustrates methods for a UE for signaling of pre-emption and/or puncturing events and their usage in UE and gNB procedures, in accordance with some embodiments of the disclosure. With reference to FIG. 13, methods that may relate to UE 1330 and hardware processing circuitry 1340 are discussed herein. Although the actions in method 1500 of FIG. 15 and method 1600 of FIG. 16 are shown in a particular order, the order of the actions can be modified. Thus, the illustrated embodiments can be performed in a different order, and some actions may be performed in parallel. Some of the actions and/or operations listed in FIGS. 15 and 16 are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause UE 1330 and/or hardware processing circuitry 1340 to perform an operation comprising the methods of FIGS. 15 and 16. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

In some embodiments, an apparatus may comprise means for performing various actions and/or operations of the methods of FIGS. 15 and 16.

Returning to FIG. 15, various methods may be in accordance with the various embodiments discussed herein. A method 1500 may comprise a processing 1510, a processing 1515, an identifying 1520, and a generating 1525.

In processing 1510, one or more configuration transmissions from the gNB carrying a rule for UL collisions may be processed. In processing 1515, a first DL transmission and a second DL transmission may be processed. In identifying 1520, a first UL transmission for the first DL transmission and a second UL transmission for the second DL transmission may be identified, the first UL transmission overlapping with the second UL transmission in at least one OFDM symbol. In generating 1525, at least one of the first UL transmission and the second UL transmission may be generated in accordance with the rule for UL collisions.

In some embodiments, the first UL transmission may be dropped in accordance with the rule for UL collisions. For some embodiments, the first UL transmission may be delayed in accordance with the rule for UL collisions. In some embodiments, the first UL transmission may be one of: a PUSCH transmission, or a PUCCH transmission, and the second UL transmission may be a PUCCH transmission.

For some embodiments, the first UL transmission may be to carry a HARQ ACK for the first DL transmission, the second UL transmission may be to carry a HARQ ACK for the second DL transmission, and/or the first UL transmission may be dropped in accordance with the rule for UL collisions. In some embodiments, the rule for UL collisions may be defined in accordance with a timing of DL transmission assignment. For some embodiments, the rule for UL collisions may be defined in accordance with a duration of the first DL transmission and/or a duration of the second DL transmission.

In some embodiments, the rule for UL collisions may be defined in accordance with a UCI type for the first UL transmission and/or a UCI type for the second UL transmission. For some embodiments, the first UL transmission may be a slot-based transmission, and the first UL transmission may be delayed in accordance with the rule for UL collisions when the first UL transmission is to carry HARQ ACK feedback. In some embodiments, the first UL transmission may be a slot-based transmission, the first UL may be to carry HARQ ACK feedback for first DL transmission, and the first UL transmission may be punctured in accordance with the rule for UL collisions.

For some embodiments, a UCI of either the first UL transmission or the second UL transmission is a joint UCI. In some embodiments, the first UL transmission may be a slot-based transmission, the second UL transmission may be a mini-slot-based transmission, and the first UL transmission may be transmitted in frequency resources contiguous to the second UL transmission. For some embodiments, the rule for UL collisions may be defined in accordance with a set of configured resources continuous in frequency.

In some embodiments, the first UL transmission may be dropped in accordance with the rule for UL collisions when resources for the first UL transmission are not contiguous with resources for the second UL transmission. For some embodiments, the second UL transmission may be a mini-slot-based transmission, the second UL transmission may comprise one or more bundled HARQ ACK bits and/or one or more compressed HARQ ACK bits. In some embodiments, the first UL transmission may be a PUCCH transmission and is associated with a first BPL, the second UL transmission may be a PUCCH transmission and is associated with a second BPL, and the first UL transmission and the second UL transmission may be transmitted simultaneously.

Returning to FIG. 16, various methods may be in accordance with the various embodiments discussed herein. A method 1600 may comprise a processing 1610 and an identifying 1615. In processing 1610, one or more configuration transmissions from the gNB carrying indicators of one or more pre-emption conditions may be processed. In identifying 1615, a received PDCCH transmission carrying a pre-emption indication may be identified in accordance with the one or more pre-emption conditions.

In some embodiments, the one or more preemption conditions may comprise a monitoring activation condition and/or a triggering condition. For some embodiments, wherein the triggering condition may comprise a failure to decode a code block of an ongoing HARQ process. In some embodiments, the triggering condition may comprise a presence of an active HARQ process.

For some embodiments, the pre-emption indication may be carried by a dedicated DCI format. In some embodiments, a CRC of DCI carrying pre-emption indication may be scrambled with a dedicated RNTI. For some embodiments, the pre-emption indication may carry an indicator of an offset to increase HARQ feedback delay for a corresponding pre-empted process.

In some embodiments, the pre-emption indication may be a field in a DCI scheduling a retransmission for an impacted HARQ process. For some embodiments, the pre-emption indication may be a bitmap with a size corresponding to one or more CBGs in a given HARQ process. In some embodiments, one or more bits of the bitmap may indicate whether one or more corresponding CBGs is pre-empted in a previous scheduling occasion of a current HARQ process.

For some embodiments, one or more bits of the bitmap may apply to one or more CBs in one or more corresponding CBGs. In some embodiments, the pre-emption indication may signal one or more pre-empted physical resources. For some embodiments, a time domain part of the pre-emption indication may be a bitmap of length 14 bit over symbols of an impacted slot, the bitmap having a length of 14 bits.

In some embodiments, the bitmap may not include symbols carrying PDCCH. For some embodiments, a granularity of indication may depend upon a configured slot duration. In some embodiments, a time-domain part of the pre-emption indication is an index of a preconfigured pattern in a set.

For some embodiments, a frequency-domain part of the pre-emption indication is a bitmap over a PRB group. In some embodiments, a frequency-domain part of the pre-emption indication is a bandwidth part index. For some embodiments, a spatial-domain part of the pre-emption indication is one of: a layer, or a set of one or more antenna port indices. In some embodiments, a scheduling of one or more pre-empted CBGs may be independent of a HARQ feedback timeline of a pre-empted HARQ process.

Figure 17:
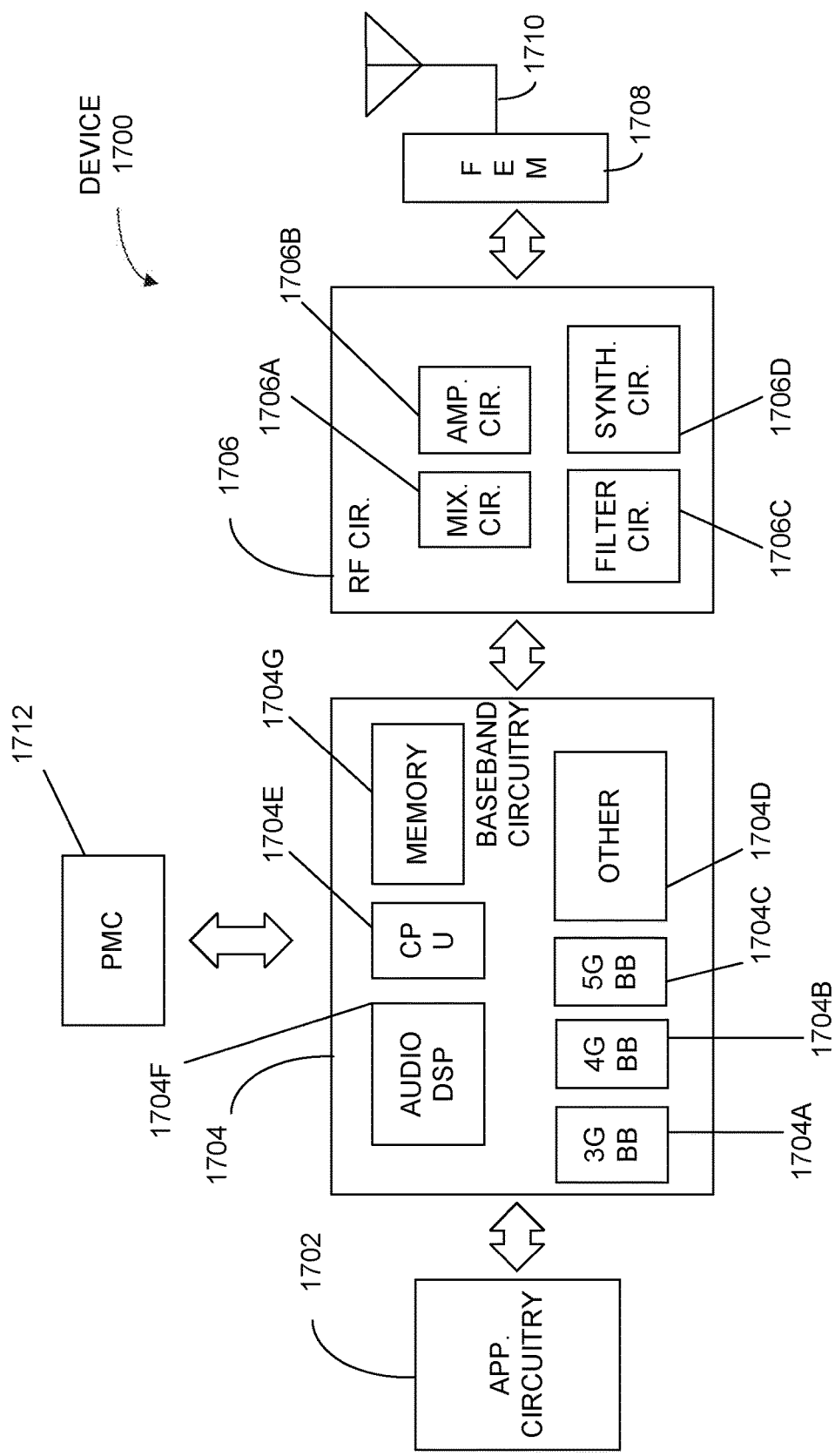
FIG. 17 illustrates example components of a device, in accordance with some embodiments of the disclosure.

FIG. 17 illustrates example components of a device, in accordance with some embodiments of the disclosure. In some embodiments, the device 1700 may include application circuitry 1702, baseband circuitry 1704, Radio Frequency (RF) circuitry 1706, front-end module (FEM) circuitry 1708, one or more antennas 1710, and power management circuitry (PMC) 1712 coupled together at least as shown. The components of the illustrated device 1700 may be included in a UE or a RAN node. In some embodiments, the device 1700 may include less elements (e.g., a RAN node may not utilize application circuitry 1702, and instead include a processor/controller to process IP data received from an EPC). In some embodiments, the device 1700 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1702 may include one or more application processors. For example, the application circuitry 1702 may include circuitry such as, but not limited to, one or more single-core or multi-core processors. The processor(s) may include any combination of general-purpose processors and dedicated processors (e.g., graphics processors, application processors, and so on). The processors may be coupled with or may include memory/storage and may be configured to execute instructions stored in the memory/storage to enable various applications or operating systems to run on the device 1700. In some embodiments, processors of application circuitry 1702 may process IP data packets received from an EPC.

The baseband circuitry 1704 may include circuitry such as, but not limited to, one or more single-core or multi-core processors. The baseband circuitry 1704 may include one or more baseband processors or control logic to process baseband signals received from a receive signal path of the RF circuitry 1706 and to generate baseband signals for a transmit signal path of the RF circuitry 1706. Baseband processing circuity 1704 may interface with the application circuitry 1702 for generation and processing of the baseband signals and for controlling operations of the RF circuitry 1706. For example, in some embodiments, the baseband circuitry 1704 may include a third generation (3G) baseband processor 1704A, a fourth generation (4G) baseband processor 1704B, a fifth generation (5G) baseband processor 1704C, or other baseband processor(s) 1704D for other existing generations, generations in development or to be developed in the future (e.g., second generation (2G), sixth generation (6G), and so on). The baseband circuitry 1704 (e.g., one or more of baseband processors 1704A-D) may handle various radio control functions that enable communication with one or more radio networks via the RF circuitry 1706. In other embodiments, some or all of the functionality of baseband processors 1704A-D may be included in modules stored in the memory 1704G and executed via a Central Processing Unit (CPU) 1704E. The radio control functions may include, but are not limited to, signal modulation/demodulation, encoding/decoding, radio frequency shifting, and so on. In some embodiments, modulation/demodulation circuitry of the baseband circuitry 1704 may include Fast-Fourier Transform (FFT), precoding, or constellation mapping/demapping functionality. In some embodiments, encoding/decoding circuitry of the baseband circuitry 1704 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1704 may include one or more audio digital signal processor(s) (DSP) 1704F. The audio DSP(s) 1704F may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1704 and the application circuitry 1702 may be implemented together such as, for example, on a system on a chip (SOC).

In some embodiments, the baseband circuitry 1704 may provide for communication compatible with one or more radio technologies. For example, in some embodiments, the baseband circuitry 1704 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 1704 is configured to support radio communications of more than one wireless protocol may be referred to as multi-mode baseband circuitry.

RF circuitry 1706 may enable communication with wireless networks using modulated electromagnetic radiation through a non-solid medium. In various embodiments, the RF circuitry 1706 may include switches, filters, amplifiers, and so on to facilitate the communication with the wireless network. RF circuitry 1706 may include a receive signal path which may include circuitry to down-convert RF signals received from the FEM circuitry 1708 and provide baseband signals to the baseband circuitry 1704. RF circuitry 1706 may also include a transmit signal path which may include circuitry to up-convert baseband signals provided by the baseband circuitry 1704 and provide RF output signals to the FEM circuitry 1708 for transmission.

In some embodiments, the receive signal path of the RF circuitry 1706 may include mixer circuitry 1706A, amplifier circuitry 1706B and filter circuitry 1706C. In some embodiments, the transmit signal path of the RF circuitry 1706 may include filter circuitry 1706C and mixer circuitry 1706A. RF circuitry 1706 may also include synthesizer circuitry 1706D for synthesizing a frequency for use by the mixer circuitry 1706A of the receive signal path and the transmit signal path. In some embodiments, the mixer circuitry 1706A of the receive signal path may be configured to down-convert RF signals received from the FEM circuitry 1708 based on the synthesized frequency provided by synthesizer circuitry 1706D. The amplifier circuitry 1706B may be configured to amplify the down-converted signals and the filter circuitry 1706C may be a low-pass filter (LPF) or band-pass filter (BPF) configured to remove unwanted signals from the down-converted signals to generate output baseband signals. Output baseband signals may be provided to the baseband circuitry 1704 for further processing. In some embodiments, the output baseband signals may be zero-frequency baseband signals, although this is not a requirement. In some embodiments, mixer circuitry 1706A of the receive signal path may comprise passive mixers, although the scope of the embodiments is not limited in this respect.

In some embodiments, the mixer circuitry 1706A of the transmit signal path may be configured to up-convert input baseband signals based on the synthesized frequency provided by the synthesizer circuitry 1706D to generate RF output signals for the FEM circuitry 1708. The baseband signals may be provided by the baseband circuitry 1704 and may be filtered by filter circuitry 1706C.

In some embodiments, the mixer circuitry 1706A of the receive signal path and the mixer circuitry 1706A of the transmit signal path may include two or more mixers and may be arranged for quadrature downconversion and upconversion, respectively. In some embodiments, the mixer circuitry 1706A of the receive signal path and the mixer circuitry 1706A of the transmit signal path may include two or more mixers and may be arranged for image rejection (e.g., Hartley image rejection). In some embodiments, the mixer circuitry 1706A of the receive signal path and the mixer circuitry 1706A may be arranged for direct downconversion and direct upconversion, respectively. In some embodiments, the mixer circuitry 1706A of the receive signal path and the mixer circuitry 1706A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1706 may include analog-to-digital converter (ADC) and digital-to-analog converter (DAC) circuitry and the baseband circuitry 1704 may include a digital baseband interface to communicate with the RF circuitry 1706.

In some dual-mode embodiments, a separate radio IC circuitry may be provided for processing signals for each spectrum, although the scope of the embodiments is not limited in this respect.

In some embodiments, the synthesizer circuitry 1706D may be a fractional-N synthesizer or a fractional N/N+1 synthesizer, although the scope of the embodiments is not limited in this respect as other types of frequency synthesizers may be suitable. For example, synthesizer circuitry 1706D may be a delta-sigma synthesizer, a frequency multiplier, or a synthesizer comprising a phase-locked loop with a frequency divider.

The synthesizer circuitry 1706D may be configured to synthesize an output frequency for use by the mixer circuitry 1706A of the RF circuitry 1706 based on a frequency input and a divider control input. In some embodiments, the synthesizer circuitry 1706D may be a fractional N/N+1 synthesizer.

In some embodiments, frequency input may be provided by a voltage controlled oscillator (VCO), although that is not a requirement. Divider control input may be provided by either the baseband circuitry 1704 or the applications processor 1702 depending on the desired output frequency. In some embodiments, a divider control input (e.g., N) may be determined from a look-up table based on a channel indicated by the applications processor 1702.

Synthesizer circuitry 1706D of the RF circuitry 1706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1706D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1706 may include an IQ/polar converter.

FEM circuitry 1708 may include a receive signal path which may include circuitry configured to operate on RF signals received from one or more antennas 1710, amplify the received signals and provide the amplified versions of the received signals to the RF circuitry 1706 for further processing. FEM circuitry 1708 may also include a transmit signal path which may include circuitry configured to amplify signals for transmission provided by the RF circuitry 1706 for transmission by one or more of the one or more antennas 1710. In various embodiments, the amplification through the transmit or receive signal paths may be done solely in the RF circuitry 1706, solely in the FEM 1708, or in both the RF circuitry 1706 and the FEM 1708.

In some embodiments, the FEM circuitry 1708 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1706). The transmit signal path of the FEM circuitry 1708 may include a power amplifier (PA) to amplify input RF signals (e.g., provided by RF circuitry 1706), and one or more filters to generate RF signals for subsequent transmission (e.g., by one or more of the one or more antennas 1710).

In some embodiments, the PMC 1712 may manage power provided to the baseband circuitry 1704. In particular, the PMC 1712 may control power-source selection, voltage scaling, battery charging, or DC-to-DC conversion. The PMC 1712 may often be included when the device 1700 is capable of being powered by a battery, for example, when the device is included in a UE. The PMC 1712 may increase the power conversion efficiency while providing desirable implementation size and heat dissipation characteristics.

While FIG. 17 shows the PMC 1712 coupled only with the baseband circuitry 1704. However, in other embodiments, the PMC 1712 may be additionally or alternatively coupled with, and perform similar power management operations for, other components such as, but not limited to, application circuitry 1702, RF circuitry 1706, or FEM 1708.

In some embodiments, the PMC 1712 may control, or otherwise be part of, various power saving mechanisms of the device 1700. For example, if the device 1700 is in an RRC_Connected state, where it is still connected to the RAN node as it expects to receive traffic shortly, then it may enter a state known as Discontinuous Reception Mode (DRX) after a period of inactivity. During this state, the device 1700 may power down for brief intervals of time and thus save power.

If there is no data traffic activity for an extended period of time, then the device 1700 may transition off to an RRC_Idle state, where it disconnects from the network and does not perform operations such as channel quality feedback, handover, and so on. The device 1700 goes into a very low power state and it performs paging where again it periodically wakes up to listen to the network and then powers down again. The device 1700 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1702 and processors of the baseband circuitry 1704 may be used to execute elements of one or more instances of a protocol stack. For example, processors of the baseband circuitry 1704, alone or in combination, may be used execute Layer 3, Layer 2, or Layer 1 functionality, while processors of the application circuitry 1704 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 18:
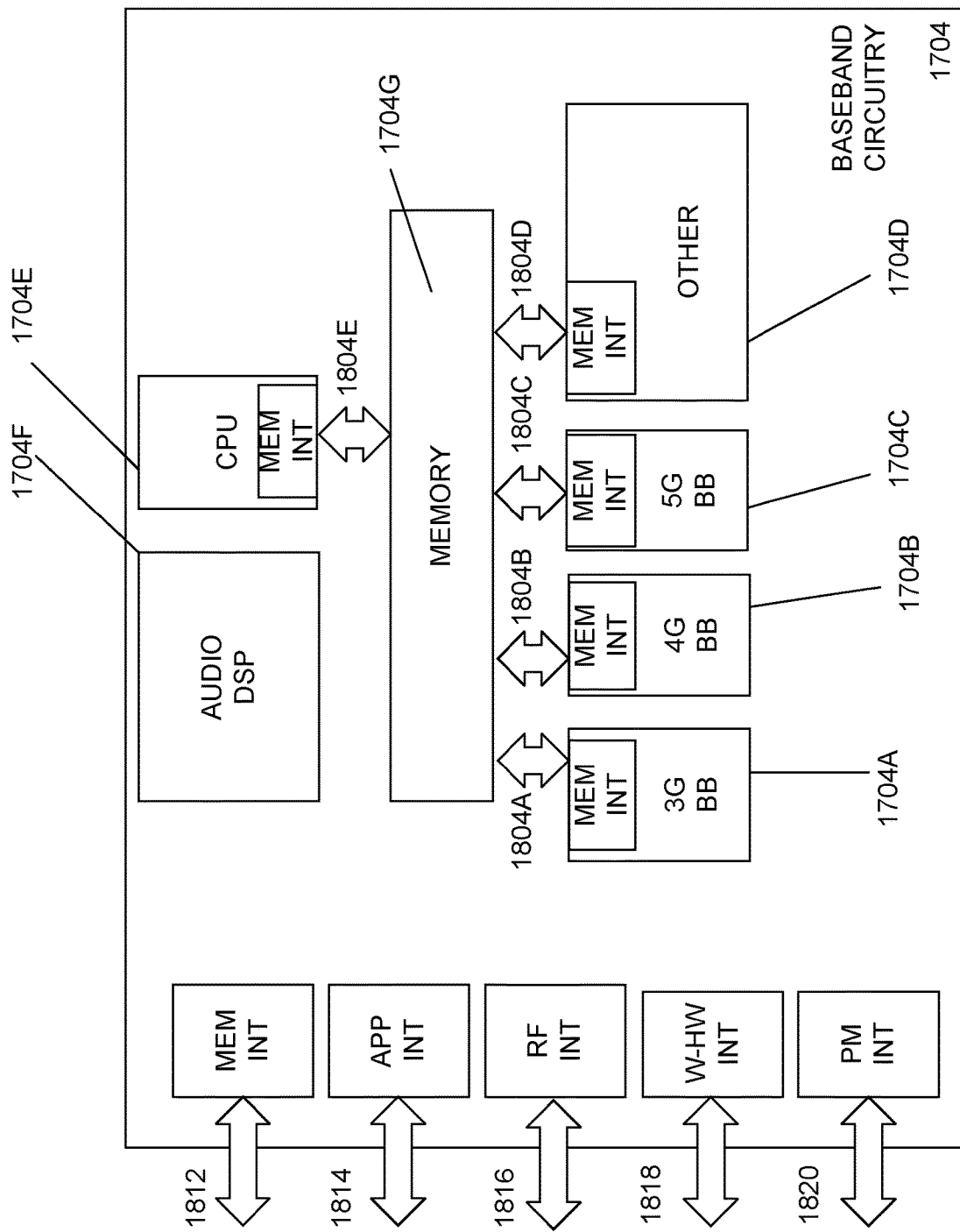
FIG. 18 illustrates example interfaces of baseband circuitry, in accordance with some embodiments of the disclosure.

FIG. 18 illustrates example interfaces of baseband circuitry, in accordance with some embodiments of the disclosure. As discussed above, the baseband circuitry 1704 of FIG. 17 may comprise processors 1704A-1704E and a memory 1704G utilized by said processors. Each of the processors 1704A-1704E may include a memory interface, 1804A-1804E, respectively, to send/receive data to/from the memory 1704G.

The baseband circuitry 1704 may further include one or more interfaces to communicatively couple to other circuitries/devices, such as a memory interface 1812 (e.g., an interface to send/receive data to/from memory external to the baseband circuitry 1704), an application circuitry interface 1814 (e.g., an interface to send/receive data to/from the application circuitry 1702 of FIG. 17), an RF circuitry interface 1816 (e.g., an interface to send/receive data to/from RF circuitry 1706 of FIG. 17), a wireless hardware connectivity interface 1818 (e.g., an interface to send/receive data to/from Near Field Communication (NFC) components, Bluetooth® components (e.g., Bluetooth® Low Energy), Wi-Fi® components, and other communication components), and a power management interface 1820 (e.g., an interface to send/receive power or control signals to/from the PMC 1712.

It is pointed out that elements of any of the Figures herein having the same reference numbers and/or names as elements of any other Figure herein may, in various embodiments, operate or function in a manner similar those elements of the other Figure (without being limited to operating or functioning in such a manner).

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus comprising:
a processor configured to:
process a configuration transmission from a base station (BS) carrying an indicator of a pre-emption condition; and
identify a received Physical Downlink Control Channel (PDCCH) transmission carrying a pre-emption indication in accordance with the pre-emption condition,
wherein a puncturing instance occurs prior to a slot carrying the pre-emption indication, the pre-emption indication providing an offset between the slot and the puncturing instance, and
wherein the pre-emption indication includes an antenna port index; and
an interface for receiving the configuration transmission and the PDCCH transmission.

2. The apparatus of claim 1, wherein the preemption condition comprises at least one of: a monitoring activation condition, and a triggering condition.

3. The apparatus of claim 2, wherein the triggering condition comprises a failure to decode a code block of an ongoing Hybrid Automatic Repeat Request (HARQ) process.

4. The apparatus of claim 2, wherein the triggering condition comprises a presence of an active Hybrid Automatic Repeat Request (HARQ) process.

5. The apparatus of claim 1, wherein the pre-emption indication is carried by a dedicated Downlink Control Information (DCI) format.

6. The apparatus of claim 5, wherein a Cyclic Redundancy Check (CRC) of the dedicated DCI format carrying the pre-emption indication is scrambled with a dedicated Radio Network Temporary Identifier (RNTI).

7. The apparatus of claim 1, wherein the preemption indication further includes an indicator of an offset to increase Hybrid Automatic Repeat Request (HARQ) feedback delay for a corresponding preempted process.

8. The apparatus of claim 1, wherein the preemption indication further includes a field in a Downlink Control Information (DCI) scheduling a retransmission for an impacted Hybrid Automatic Repeat Request (HARQ) process.

9. The apparatus of claim 1, wherein the preemption indication further includes a bitmap having a size corresponding to one or more Code Block Groups (CBGs) in a given Hybrid Automatic Repeat Request (HARQ) process.

10. The apparatus of claim 1, wherein the preemption indication further includes a bitmap having at least one bit indicating whether one or more corresponding Code Block Groups (CBGs) are pre-empted in a previous scheduling occasion of a current Hybrid Automatic Repeat Request (HARQ) process.

11. The apparatus of claim 1, wherein the preemption indication further includes a bitmap having a bit indicating a code block (CB) in a corresponding Code Block Group (CBG).

12. The apparatus of claim 1, wherein a time domain part of the preemption indication is a bitmap corresponding to symbols of an impacted slot, the bitmap having a length of 14 bits.

13. A method comprising:
receiving, via an interface, a configuration transmission and a Physical Downlink Control Channel (PDCCH) transmission from a base station (BS);
processing, by a processor, the configuration transmission, the configuration transmission carrying an indicator of a pre-emption condition; and identifying, by the processor, the PDCCH transmission, the PDCCH transmission carrying a pre-emption indication in accordance with the pre-emption condition, wherein a puncturing instance occurs prior to a slot carrying the pre-emption indication, the pre-emption indication providing an offset between the slot and the puncturing instance, and wherein the pre-emption indication includes an antenna port index.

14. The method of claim 13, wherein the preemption condition comprises at least one of: a monitoring activation condition, and a triggering condition.

15. The method of claim 14, wherein the triggering condition comprises a failure to decode a code block of an ongoing Hybrid Automatic Repeat Request (HARQ) process.

16. The method of claim 14, wherein the triggering condition comprises a presence of an active Hybrid Automatic Repeat Request (HARQ) process.

17. The method of claim 13, wherein the pre-emption indication is carried by a dedicated Downlink Control Information (DCI) format.

18. The method of claim 17, wherein a Cyclic Redundancy Check (CRC) of the dedicated DCI format carrying the pre-emption indication is scrambled with a dedicated Radio Network Temporary Identifier (RNTI).

19. The method of claim 17, wherein the preemption indication further includes an indicator of an offset to increase Hybrid Automatic Repeat Request (HARQ) feedback delay for a corresponding preempted process.

20. The method of claim 17, wherein the preemption indication further includes a field in a DCI scheduling a retransmission for an impacted Hybrid Automatic Repeat Request (HARQ) process.

* * * * *